US008768602B2

(12) United States Patent
Suzuki

(10) Patent No.: US 8,768,602 B2
(45) Date of Patent: Jul. 1, 2014

(54) STRADDLE-TYPE VEHICLE AND COMBUSTION CONTROLLER FOR STRADDLE-TYPE VEHICLE

(75) Inventor: Hironobu Suzuki, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 2202 days.

(21) Appl. No.: 11/577,493

(22) PCT Filed: Oct. 20, 2005

(86) PCT No.: PCT/JP2005/019290
§ 371 (c)(1), (2), (4) Date: May 15, 2009

(87) PCT Pub. No.: WO2006/043622
PCT Pub. Date: Apr. 27, 2006

(65) Prior Publication Data

US 2009/0222192 A1 Sep. 3, 2009

(30) Foreign Application Priority Data

Oct. 20, 2004 (JP) ................................ 2004-305221

(51) Int. Cl.
*G06F 19/00* (2011.01)

(52) U.S. Cl.
USPC ............................ 701/111; 701/103; 181/214

(58) Field of Classification Search
USPC ................ 701/103, 111; 381/71, 94; 181/214
See application file for complete search history.

(56) References Cited

U.S. PATENT DOCUMENTS 3,936,606 A * 2/1976 Wanke ......................... 381/71.5
4,557,106 A * 12/1985 Ffowcs Williams et al. ......................... 60/39.281
5,319,715 A * 6/1994 Nagami et al. ............. 381/71.14
5,321,759 A 6/1994 Yuan .............................. 381/71
5,511,127 A * 4/1996 Warnaka ...................... 381/71.5
6,308,572 B1 * 10/2001 Ishikawa et al. ................ 73/597
2006/0208169 A1 * 9/2006 Breed et al. ................... 250/221

FOREIGN PATENT DOCUMENTS

EP 1 219 805 A2 7/2002
EP 1 300 581 A2 4/2003
EP 1 531 253 A2 5/2005
JP 03-028041 2/1991
JP 05-006186 1/1993
JP 2000-064892 2/2000

(Continued)

OTHER PUBLICATIONS

English-language translation of Japanese patent document No. 2002-188489 dated Jul. 5, 2002.

(Continued)

*Primary Examiner* — John Kwon
(74) *Attorney, Agent, or Firm* — Rabin & Berdo, P.C.

(57) ABSTRACT

A straddle-type vehicle 30 includes a vehicle body frame 31, an engine 1 mounted on the vehicle body frame 31, combustion adjusting devices (fuel injection valves) 14 and 15 for adjusting the combustion condition of the engine 1, and a combustion controller (ECU) 22 for controlling the fuel injection valves 14 and 15. The ECU 22 controls the fuel injection valves 14 and 15 such that the maximum point of a sound pressure level waveform of an audible sound wave generated from the engine 1 or the vehicle body frame 31 is shifted by a predetermined amount or larger within a predetermined period at least in some of the operation conditions of the engine 1.

22 Claims, 16 Drawing Sheets

(56) References Cited

FOREIGN PATENT DOCUMENTS

| | | |
|---|---|---|
| JP | 2002-188489 | 7/2002 |
| JP | 2002-364433 | 12/2002 |
| JP | 2003-113748 | 4/2003 |
| JP | 2004-156503 | 6/2004 |
| JP | 2005-162173 | 6/2005 |
| JP | 2005-180347 | 7/2005 |

OTHER PUBLICATIONS

English-language translation of Japanese patent document No. 2000-064892 dated Feb. 29, 2000.

English-language translation of Japanese patent document No. 2004-156503 dated Jun. 3, 2004.

* cited by examiner

Fig. 18

(a) a PATTERN "HIGH-LOW"

(b) b PATTERN "HIGH-LOW-LOW"

(c) c PATTERN "HIGH-LOW-LOW-LOW"

(d) d PATTERN "HIGH-HIGH-LOW-HIGH"

⋮

(e) a, a, a, · · · · · · · · · · ·

(f) a, b, a, b, · · · · · · · · · · ·

(g) a, b, c, a, b, c, · · · · · · · · · ·

(h) a, a, b, d, a, a, b, d, · · · · ·

(i) a, d, c, a, c, b, a, · · · · · · ·

STRADDLE-TYPE VEHICLE AND COMBUSTION CONTROLLER FOR STRADDLE-TYPE VEHICLE

TECHNICAL FIELD

The present invention relates to a straddle-type vehicle such as a motorcycle and a combustion controller for the vehicle.

BACKGROUND ART

Typically, the combustion condition of an engine is controlled such that the engine can rotate in the most possible stable and smooth manner. For example, for controlling the fuel injection amount such that the engine revolution speed becomes a target idling revolution speed at the time of start-up of the engine, such a method has been used in which the target idling revolution speed is accurately established in accordance with the progress of the warm-up condition of the engine (see Patent Reference No. 1, for example).

Patent Reference No. 1: JP-A-2002-364433

DISCLOSURE OF THE INVENTION

Problems that the Invention is to Solve

However, when the engine rotates in an extremely stable and smooth manner, some users cannot feel that the engine is operating though the engine is actually rotating depending on the vehicle types and applications on which the engine is mounted. Particularly for motorcycles, some riders wish to feel that the engine is dynamically operating, i.e., the engine is actually existing rather than desire stable and smooth rotation of the engine. It is therefore possible that the users who have such demands are not satisfied with the vehicle which only controls the combustion condition of the engine such that the engine can rotate stably and smoothly.

The invention has been thus developed to overcome the above problems. It is an object of the invention to provide a straddle-type vehicle from which a person sitting on the vehicle or a person around the vehicle can obtain the actual feeling that the engine is existing, i.e., the engine is actually operating.

Means for Solving the Problems

A straddle-type vehicle according to a first aspect of the invention includes: a vehicle body frame; an engine mounted on the vehicle body frame; a combustion adjusting device for adjusting the combustion condition of the engine; and a combustion controller for controlling the combustion adjusting device. The straddle-type vehicle is characterized in that the combustion controller controls the combustion adjusting device such that the maximum point of a sound pressure level waveform of an audible sound wave generated from the engine or the vehicle body frame is shifted by a predetermined amount or larger within a predetermined period at least in some of the operation conditions of the engine.

According to the invention, shown below are specific examples of the shift of the maximum point of a sound pressure level waveform by a predetermined amount or larger within a predetermined period. It is therefore obvious that these specific examples are shown only for easy understanding of the invention, and that the scope of the invention as claimed is not limited to those examples.

As shown in FIGS. 18(*a*) through 18(*d*) and the like, the scope of the invention includes such cases as (a), (b), (c), (d), and the like in which various patterns of sounds generated from the engine are repeated. In pattern (a), sounds generated from the engine change as “high-low” within a predetermined period (such as 100 msec.) by the change amount of a predetermined value (such as 5 dB), and repeat this change pattern. In pattern (b), sounds generated from the engine change as “high-low-low” within a predetermined period (such as 1,500 msec.) by the change amount of a predetermined value (such as 3 dB) between the high sounds and low sounds, and repeat this pattern. In pattern (c), sounds generated from the engine change as “high-low-low-low” within a predetermined period (such as 2,000 msec.) by the change amount of a predetermined value (such as 5 dB) between the high sounds and low sounds, and repeat this pattern. Similarly, in pattern (d), sounds generated from the engine change as “high-high-low-high” by the change amount of a predetermined value (such as 1 dB) between the high sounds and low sounds, and repeat this pattern.

In a preferable example according to the first aspect of the invention, the combustion controller controls the combustion adjusting device such that a person sitting on the straddle-type vehicle or positioned adjacent to the straddle-type vehicle can recognize the shift of the maximum point of the sound pressure level waveform.

In another preferable example according to the first aspect of the invention, the predetermined period is in the range from 40 milliseconds to 4,000 milliseconds, and the predetermined amount is 1 dB or larger.

In still another preferable example according to the first aspect of the invention, the combustion adjusting device includes any one of a fuel supply device, an ignition device, an intake valve or exhaust valve opening/closing timing adjusting device, an equivalent pipe length adjusting device for intake pipe or exhaust pipe, an electrically powered throttle control device, and an idling speed adjusting device, or combinations of a plurality of those.

In still another preferable example according to the first aspect of the invention, the straddle-type vehicle includes a sensor for detecting the operation condition of the engine, and the combustion controller controls the combustion adjusting device such that the maximum point of a sound pressure level waveform of an audible sound wave generated from the engine or the vehicle body frame is shifted by a predetermined amount or larger within a predetermined period based on signals from the sensor at least in some of the operation conditions of the engine.

In still another preferable example according to the first aspect of the invention, the straddle-type vehicle includes a sensor for detecting the operation condition of the engine, and the combustion controller controls the combustion adjusting device such that the maximum point of a sound pressure level waveform of an audible sound wave generated from the engine or the vehicle body frame is shifted by a predetermined amount or larger within a predetermined period based on signals from the sensor in the idling condition of the engine.

In still another preferable example according to the first aspect of the invention, the combustion controller can be switched between a change mode in which the maximum point of a sound pressure level waveform of an audible sound wave generated from the engine or the vehicle body frame is shifted by a predetermined amount or larger within a predetermined period and a standard mode in which the combustion condition of the engine becomes a combustion condition corresponding to a target operation condition.

In a preferable and more specific example according to the first aspect of the invention, the straddle-type vehicle includes a sensor for detecting the operation condition of the engine, and the combustion controller controls the combustion adjusting device such that the change mode is selected at least in a part of the idling condition of the engine and such that the standard mode is selected at least in some of the operation conditions other than the idling condition based on signals from the sensor.

In another preferable and more specific example according to the first aspect of the invention, the straddle-type vehicle includes a sensor for detecting the operation condition of the vehicle, and the combustion controller controls the combustion adjusting device such that the standard mode is selected at least in a part of the constant speed running condition of the vehicle based on signals from the sensor.

In still another preferable and more specific example according to the first aspect of the invention, the straddle-type vehicle includes a sensor for detecting the operation condition of the engine, and the combustion controller controls the combustion adjusting device such that the standard mode is selected at least in a part of the acceleration condition of the engine based on signals from the sensor.

In still another preferable example according to the first aspect of the invention, the combustion controller controls the combustion adjusting device such that the maximum point of the sound pressure level waveform in the high frequency band of the audible sound wave is shifted by a predetermined amount or larger within a predetermined period.

In still another preferable example according to the first aspect of the invention, the combustion controller controls the combustion adjusting device such that the maximum point of the sound pressure level waveform in the low frequency band of the audible sound wave is shifted by a predetermined amount or larger within a predetermined period.

In still another preferable example according to the first aspect of the invention, the combustion controller controls the combustion adjusting device such that the shift of the maximum point is periodically caused.

Specific examples of the periodical shift of the maximum point are shown below. It is obvious that these specific examples are shown only for easy understanding of the invention, and that the scope of the invention as claimed is not limited to those examples.

For example, such cases as the patterns shown in FIGS. 18(*a*) through 18(*d*) are repeated as shown in FIGS. 18(*e*) through 18(*h*) are included in the periodical shift of the maximum point.

For example, FIG. 18(*e*) shows the case in which any one of the patterns (a) through (d) is repeated as a-a - - - , b-b - - - , and FIG. 18(*f*) shows any two of the patterns (a) through (d) are repeated alternately as a-b-a-b. FIG. 18(*g*) shows any three of the patterns (a) through (d) are repeated alternately as a-b-c-a-b-c, and FIG. 18(*h*) shows such a pattern where any one of the patterns (a) through (d) is repeated twice and some of the other patterns once. All these cases are included in the periodical shift of the maximum point.

In still another preferable example according to the first aspect of the invention, the combustion controller controls the combustion adjusting device such that the shift of the maximum point is randomly caused.

A specific example of the random shift of the maximum point is shown below. It is obvious that these specific examples are shown only for easy understanding of the invention, and that the scope of the invention as claimed is not limited to this example.

For example, when the combustion adjusting device is controlled such that the patterns shown in FIGS. 18(*a*) through 18(*d*) are repeated not on a regular basis but appear at random as shown in FIG. 18(*i*), this case is included in the random shift of the maximum point.

A combustion controller, according to a second aspect of the invention, for a straddle-type vehicle which controls a combustion adjusting device for adjusting the combustion condition of an engine mounted on a vehicle body frame controls the combustion adjusting device such that the maximum point of a sound pressure level waveform of an audible sound wave generated from the engine or the vehicle body frame is shifted by a predetermined amount or larger within a predetermined period at least in some of the operation conditions of the engine.

In a preferable example according to the second aspect of the invention, the combustion controller controls the combustion adjusting device such that a person sitting on the straddle-type vehicle or positioned adjacent to the straddle-type vehicle can recognize the shift of the maximum point of the sound pressure level waveform.

A straddle-type vehicle according to a third aspect of the invention includes a vehicle body frame, an engine mounted on the vehicle body frame, a fuel supply device for adjusting the amount of fuel to be supplied to the engine, and a combustion controller for controlling the fuel supply device. The straddle-type vehicle is characterized in that the combustion controller controls the fuel supply device such that the amount of fuel to be supplied to a specific cylinder of the engine is shifted by 10% or larger at least in a part of the idling condition of the engine to change a sound pressure level of an audible sound wave generated from the engine or the vehicle body frame.

A combustion controller for a straddle-type vehicle according to a fourth aspect of the invention controls a fuel supply device for adjusting the amount of fuel to be supplied to an engine mounted on a vehicle body frame. The combustion controller is characterized by controlling the fuel supply device such that the amount of fuel to be supplied to a specific cylinder of the engine is shifted by 10% or larger at least in a part of the idling condition of the engine to change a sound pressure level of an audible sound wave generated from the engine or the vehicle body frame.

A straddle-type vehicle according to a fifth aspect of the invention includes a vehicle body frame, an engine mounted on the vehicle body frame, an ignition device for adjusting ignition of the engine, and a combustion controller for controlling the ignition device. The straddle-type vehicle is characterized in that the combustion controller controls the ignition device such that the ignition timing for a specific cylinder of the engine is shifted by 5° or larger at least in a part of the idling condition of the engine to change a sound pressure level of an audible sound wave generated from the engine or the vehicle body frame.

A combustion controller for a straddle-type vehicle according to a sixth aspect of the invention controls an ignition device for adjusting ignition of an engine mounted on a vehicle body frame. The combustion controller is characterized by controlling the ignition device such that the ignition timing for a specific cylinder of the engine is shifted by 5° or larger at least in a part of the idling condition of the engine to change a sound pressure level of an audible sound wave generated from the engine or the vehicle body frame.

A straddle-type vehicle according to a seventh aspect of the invention includes a vehicle body frame, an engine mounted on the vehicle body frame, an intake amount adjusting device for adjusting the intake air amount to the engine; and a combustion controller for controlling the intake amount adjusting device. The straddle-type vehicle is characterized in that the combustion controller controls the intake amount adjusting device such that the intake air amount to a specific cylinder of the engine is altered by 10% or larger at least in a part of the idling condition of the engine to change a sound pressure level of an audible sound wave generated from the engine or the vehicle body frame.

A combustion controller for a straddle-type vehicle according to an eighth aspect of the invention controls an intake air adjusting device for adjusting the intake air amount to an engine mounted on a vehicle body frame. The combustion controller is characterized by controlling the intake amount adjusting device such that the intake air amount to a specific cylinder of the engine is altered by 10% or larger at least in a part of the idling condition of the engine to change a sound pressure level of an audible sound wave generated from the engine or the vehicle body frame.

According to the invention, the shift of the maximum point of a sound pressure level waveform of an audible sound wave by a predetermined amount or larger within a predetermined period herein includes not only such a case where the difference between the adjoining maximum points is a predetermined value or larger but also such a case where the difference between the largest maximum point and the smallest maximum point within a predetermined period (such as 40 to 4,000 milliseconds) is a predetermined value or larger.

Known examples of the combustion adjusting device involve a fuel supply device such as a fuel injection valve and an electronic evaporator, an ignition device, an intake amount adjusting device for adjusting the amount of intake air to be taken into the engine, and the like. However, other devices may be used as the combustion adjusting device according to the invention as long as they can adjust the combustion condition of the engine. Known examples of the intake amount adjusting device involve an intake valve or exhaust valve open/close timing adjusting device, an equivalent pipe length adjusting device for intake pipe or exhaust pipe, an electrically powered throttle control device, an idling speed adjusting device, and the like. However, other devices may be used as the intake amount adjusting device according to the invention as long as they can adjust the amount of intake air to be taken into the engine. The combustion adjusting device may be constituted by one or a plurality of these examples. Examples of the equivalent pipe length adjusting device for intake pipe or exhaust pipe include a device for adjusting the actual length of intake pipe or exhaust pipe, and a device for substantially adjusting the pulsating effect of intake air or exhaust air by a valve equipped on the intake pipe or exhaust pipe or the like.

Examples of the engine according to the invention involve not only the engine main body but also an air intake device such as an air cleaner and an intake port, an air exhaust device such as an exhaust pipe and a muffler, and all other components associated with the operation of the engine.

Known examples of the sensor for detecting the operation condition of the engine involve a crank angle sensor for detecting the revolution speed of the engine, an airflow meter, an intake pressure sensor, a throttle valve opening sensor, and other sensors. However, the sensor for detecting the operation condition of the engine according to the invention is not limited to those examples.

Known examples of the sensor for detecting the operation condition of the vehicle involve a vehicle speed sensor, an accelerator position sensor operated by the rider, a brake sensor, and other sensors. However, the sensor for detecting the operation condition of the vehicle according to the invention is not limited to those examples.

Examples of the straddle-type vehicle according to the invention involve a motorcycle, a buggy, and other vehicles which have two to four wheels and on which a person can ride in a manner sitting in the straddle. Examples of the straddle-type vehicle according to the invention also include a scooter-type vehicle having a foot board on which legs of a person can be placed side by side.

Apparently, the shift of the sound pressure level at least in a part of the idling condition according to the invention includes not only such a case where the sound pressure level is always varied in the idling condition but also such a case where the sound pressure level is varied in a range other than a predetermined range in the idling condition. More specifically, the change mode is not always required to be selected for the combustion condition of the engine in the idling condition according to the invention, but the standard mode may be selected for the combustion condition of the engine in lieu of the change mode in the idling condition at the time of warm-up start or extremely unstable engine revolution or in other cases.

Apparently, stabilizing the sound pressure level at least in a part of the constant speed running condition according to the invention includes not only such a case where the sound pressure level is always stabilized in the constant speed running condition but also such a case where the sound pressure level is stabilized in a range other than a predetermined range in the constant speed running condition.

Apparently, stabilizing the sound pressure level at least in a part of the acceleration condition according to the invention includes not only such a case where the sound pressure level is always stabilized in the acceleration condition but also such a case where the sound pressure level is stabilized in a range other than a predetermined range in the acceleration condition. It is also possible to combine the respective control in the idling condition, in the low speed running condition, and in the acceleration condition.

The shift of the maximum point of the sound pressure level waveform according to the invention refers to the shift of the maximum point of the sound pressure level waveform produced during one cycle (one cycle combustion) of the engine by one cycle, a predetermined plurality of cycles, or random plural cycles (random cycles) of the engine. This shift includes not only the shift of the maximum point of the sound pressure level waveform by a predetermined amount or larger in comparison with the same cylinder but also the shift of the maximum point of the sound pressure level waveform by a predetermined amount or larger in comparison with a different cylinder. The shift of the maximum point by a predetermined amount or larger within a predetermined period refers to the shift of the maximum point which can be felt. The shift of the maximum point by random cycles according to the invention means the shift of the maximum point caused by intentionally varying the fuel supply amount by random cycles, for example.

The audible sound wave according to the invention refers to a sound in a frequency easily recognizable to the human ears (20 Hz to 20 KHz). More specifically, sounds in 5 KHz to 20 KHz fall within the audible sound wave according to the invention.

In the standard mode in which the combustion adjusting device is controlled such that the combustion condition of the engine becomes the combustion condition corresponding to a target operation condition of the engine according to the invention, the combustion condition of the engine is controlled such that the engine can rotate in a most possible stable and smooth manner. For example, the combustion condition of the engine is controlled such that the engine can stably rotate at the idle revolution speed in the idling condition, and such that sufficient acceleration can be obtained in the acceleration condition. Thus, the engine setting in the standard mode is similar to the engine setting in the conventional structure. While the shift amount of the maximum point of the sound pressure level waveform of the audible sound wave generated from the engine or the vehicle body frame is the predetermined value or larger within the predetermined period in the change mode as described above, the shift amount of the maximum point in the standard mode is smaller than the predetermined value.

Advantage of the Invention

According to the first and second aspects of the invention, the combustion adjusting device is controlled such that the maximum point of the sound pressure level waveform of the audible sound wave generated from the engine or the vehicle body frame is shifted by a predetermined amount or larger within a predetermined period at least in some of the operation conditions. Thus, the maximum point of the sound pressure level waveform varies by one cycle, a plurality of cycles, or random cycles. Accordingly, the rider can more easily feel that the engine is rotating than in the case where the maximum point of the sound pressure level waveform does not greatly change, and thus a person sitting on the vehicle or a person around the vehicle can positively feel the operation of the engine.

In an example according to the invention, a person sitting on the straddle-type vehicle or positioned adjacent to the straddle-type vehicle can recognize the shift of the maximum point of the sound pressure level waveform. In another example, the predetermined period is in the range from 40 milliseconds to 4,000 milliseconds and the predetermined amount is 1 dB or larger. Thus, the rider or the person around the vehicle can feel the operation of the engine.

In still another example according to the invention, the combustion adjusting device includes any one of a fuel supply device, an ignition device, an intake valve or exhaust valve opening/closing timing adjusting device, an equivalent pipe length adjusting device for intake pipe or exhaust pipe, an electrically powered throttle control device, and an idling speed adjusting device, or combinations of a plurality of those. Thus, the maximum point of the sound pressure level waveform described above can be shifted using conventional devices equipped in the vehicle.

In still another example according to the invention, the maximum point of the sound pressure level waveform is shifted at least in some of the operation conditions of the engine in accordance with signals of the sensor for detecting the operation conditions of the engine. It is therefore possible to selectively shift the maximum point of the sound pressure level waveform in particular operation conditions such as the idling operation condition and not to shift in other operation conditions.

Since the shift amount of the maximum point of the sound pressure level waveform is controlled to be shifted by a predetermined amount or larger during the idling condition, the rider can clearly feel that the engine is dynamically operating in the idling condition. In the idling condition, the rider not sitting on the vehicle can feel the operation of the engine at the time of vehicle stop.

Since the rider can easily feel the operation of the engine in the idling condition, such an erroneous operation that the rider pushes the engine start switch even in the idling operation can be prevented. More specifically, when the idling revolution is extremely stable and smooth as in the conventional structure, the start switch may be pushed through erroneous recognition that the engine has been stopped. However, this problem can be solved according to the invention.

In still another example according to the invention, it is possible to switch between the change mode in which the maximum point of the sound pressure level waveform is shifted by a predetermined amount or larger within a predetermined period and the standard mode in which the combustion condition becomes a combustion condition corresponding to a target operation condition. Thus, the rider can feel the operation of the engine only when he or she desires to feel it according to the preference of the rider. For example, the rider can freely select the change mode in the idling condition and the standard mode in the constant speed running condition and acceleration condition, or other selections.

More specifically, when the change mode is selected in the idling condition of the engine, the rider can feel the dynamic operation of the engine. When the standard mode is selected in the constant running condition, the problem that the rider rather feels tired with useless change of sound and vibration at the time of constant speed successive running or other occasions can be solved. When the standard mode is selected in the acceleration running range, lowering of start acceleration and overtaking acceleration can be prevented. More specifically, in some cases the fuel injection amount is decreased by a predetermined cycle in the change mode as will be described later, for example, and in this case the output of the engine is lowered accordingly. Thus, there is a possibility of lowering of acceleration when the change mode is selected in the acceleration running range. However, according to this example, this possibility can be eliminated.

In still another example according to the invention, the maximum point of the sound pressure level waveform in the high frequency band of the audible sound wave is shifted or the maximum point of the sound pressure level waveform in the low frequency band of the audible sound wave is shifted. Thus, the rider can more positively feel the change of the sound pressure level or the like.

In still another example according to the invention, the shift of the maximum point is periodically caused or randomly caused. Thus, the shift of the maximum point of the sound pressure level can be widened without increasing the entire sound pressure level.

The sound pressure level is varied by altering the amount of fuel supplied to a specific cylinder by 10% or larger according to the third and fourth aspects of the invention, by altering the ignition timing of a specific cylinder by 10° or larger according to the fifth and sixth aspects of the invention, and by altering the intake air amount to a specific cylinder by 10% or larger according to the seventh and eighth aspects of the invention. Thus, the rider or the person around the vehicle can feel the rotation of the engine by the simple and specific structure.

BRIEF DESCRIPTION OF THE DRAWINGS

FIGS. 18(*a*) through 18(*i*) are explanatory views showing shift patterns of maximum points of sound pressure level waveforms and the like according to the invention.

DESCRIPTION OF REFERENCE NUMERALS AND SIGNS

1 engine main body
22 ECU (operation condition detection unit, combustion controller)
30 motorcycle
31 vehicle body frame

BEST MODE FOR CARRYING OUT THE INVENTION

Several embodiments according to the invention are hereinafter described with reference to the accompanying drawings.

Figure 1:
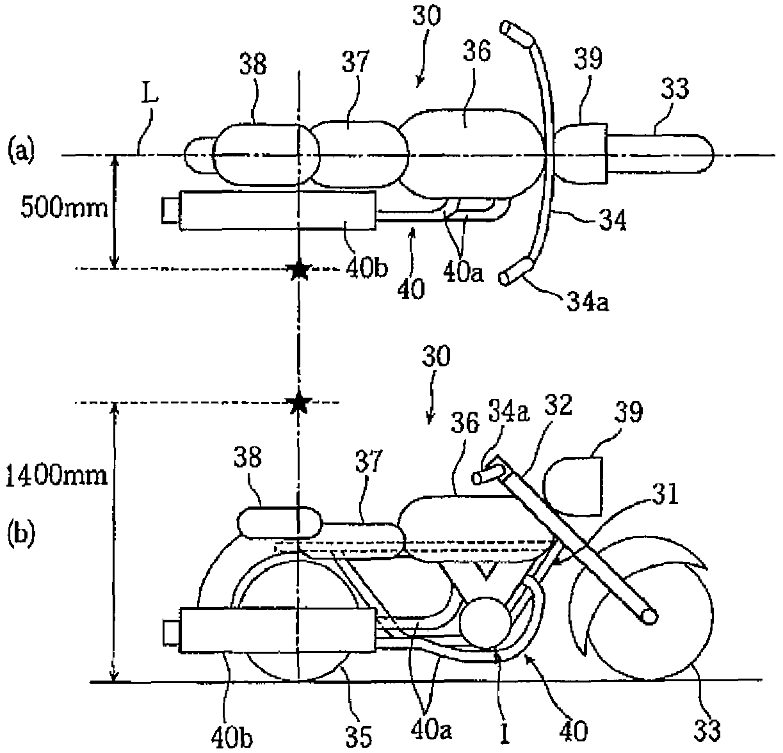
FIGS. 1(*a*) and 1(*b*) schematically illustrate a motorcycle on which an engine in an embodiment according to the invention is mounted.
Figure 2:
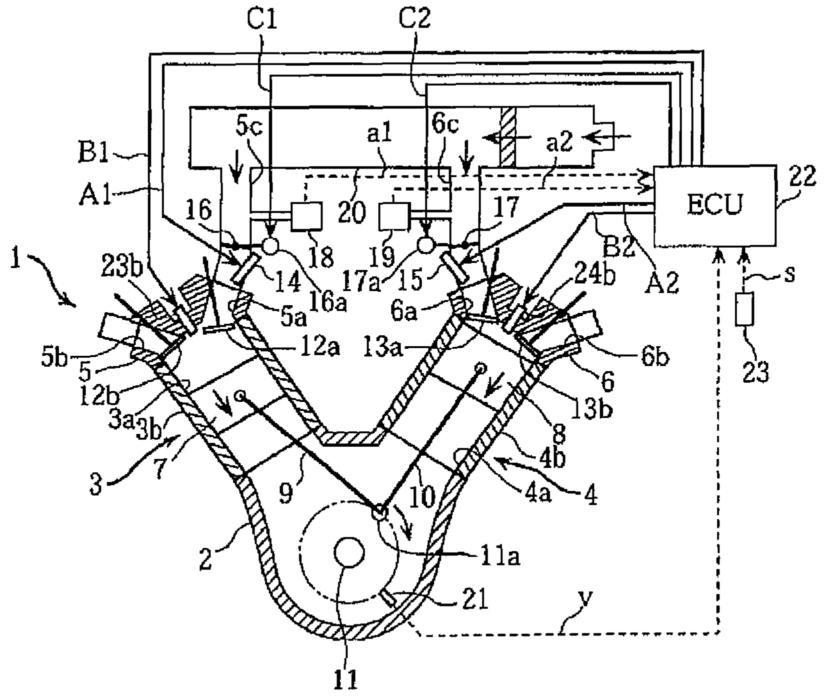
FIG. 2 schematically shows a structure of the engine.
Figure 3:
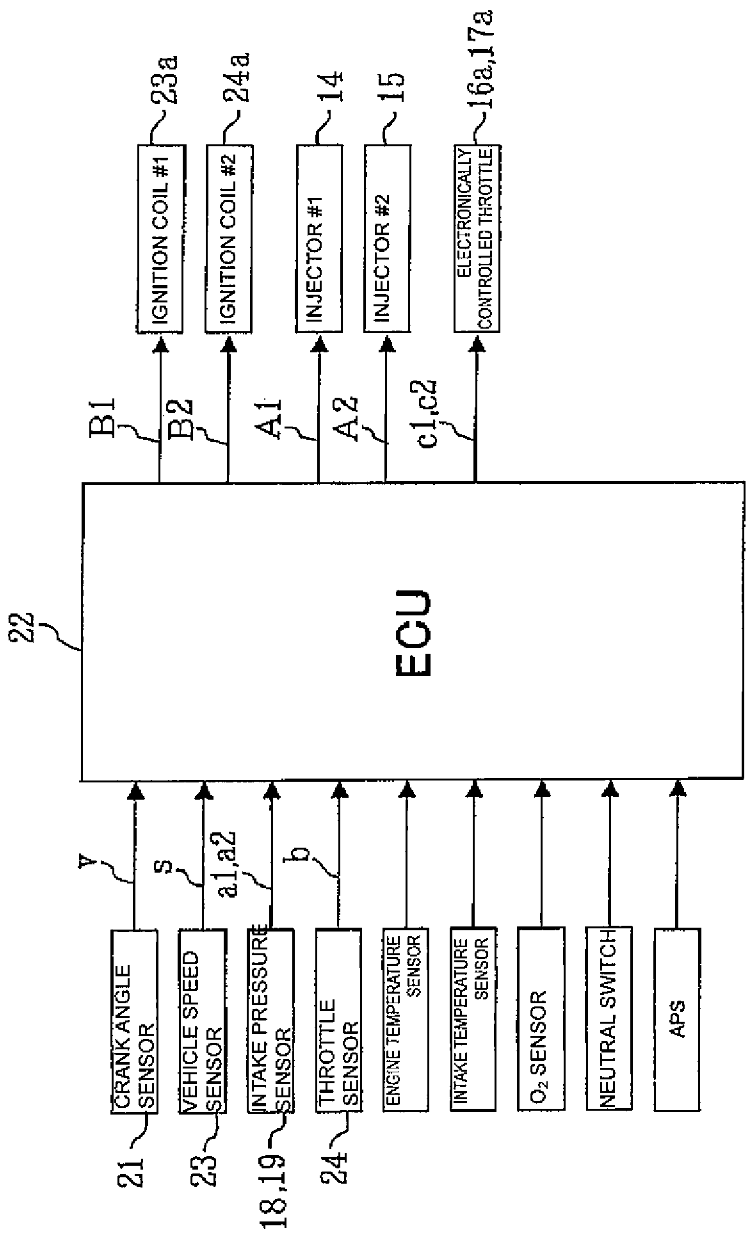
FIG. 3 is a block diagram schematically showing a combustion controller of the engine.
Figure 4:
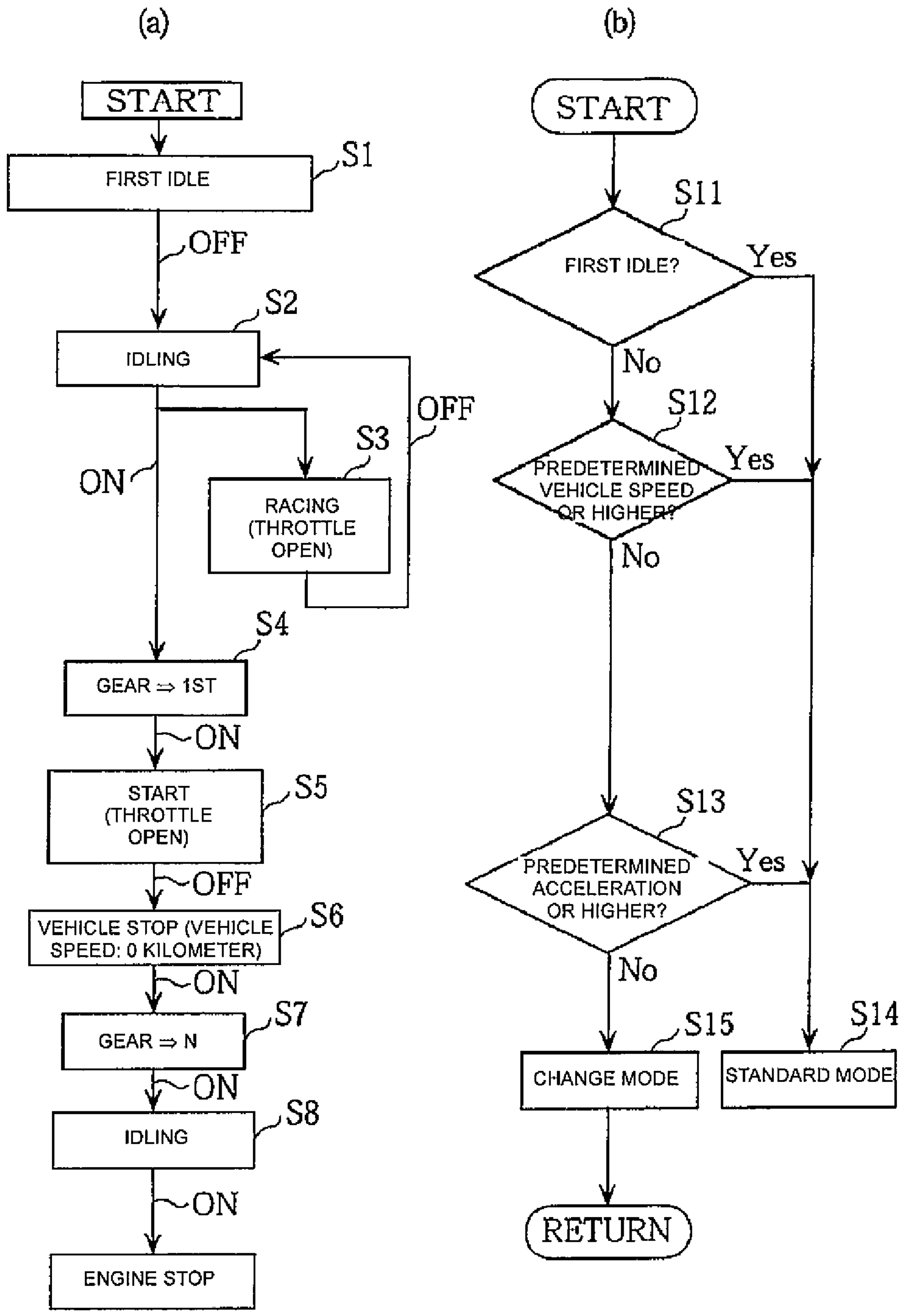
FIGS. 4(*a*) and 4(*b*) are flowcharts showing processes performed by the controller.
Figure 5:
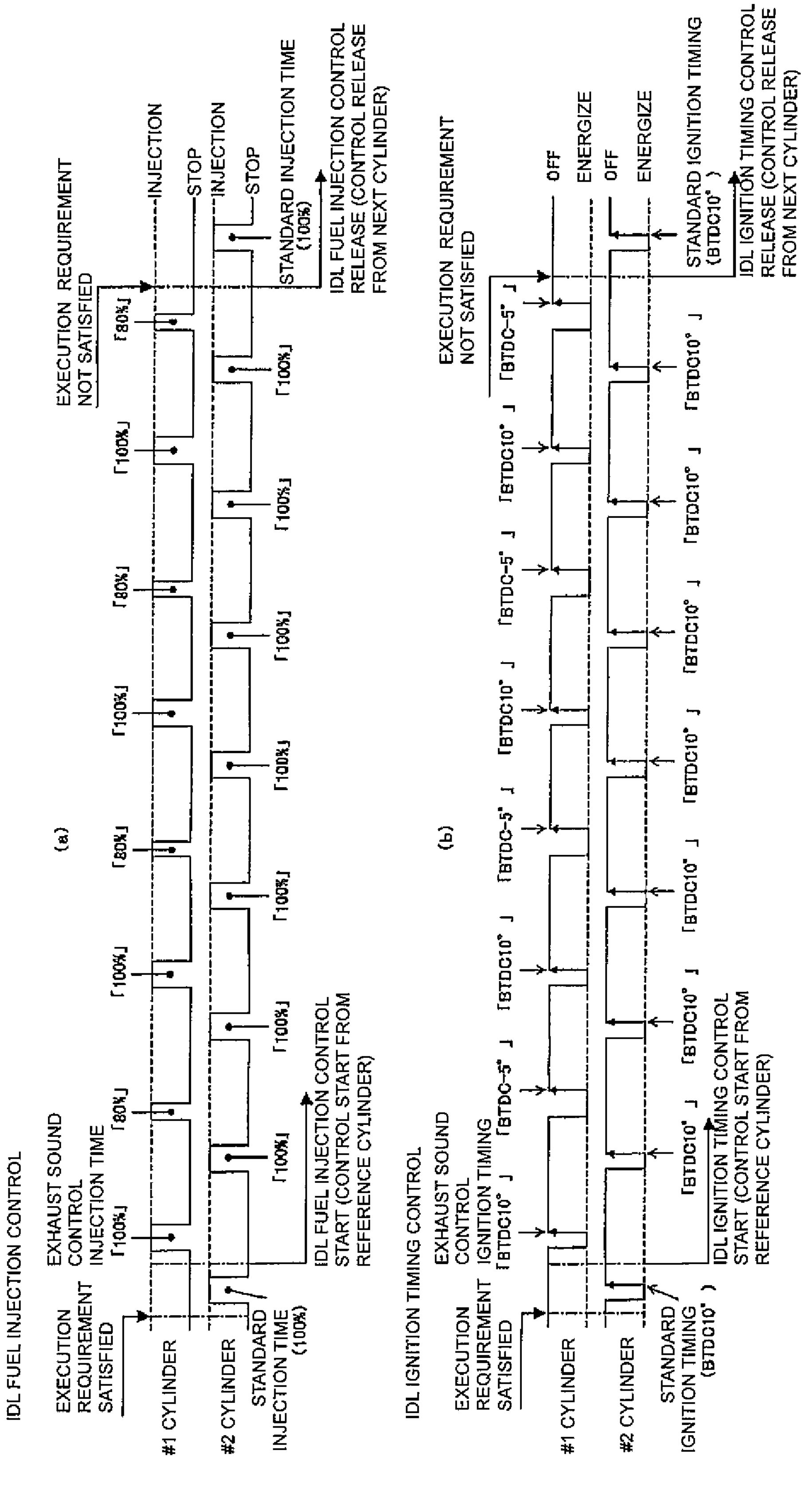
FIGS. 5(*a*) and 5(*b*) are waveform charts of control performed by the controller.
Figure 6:
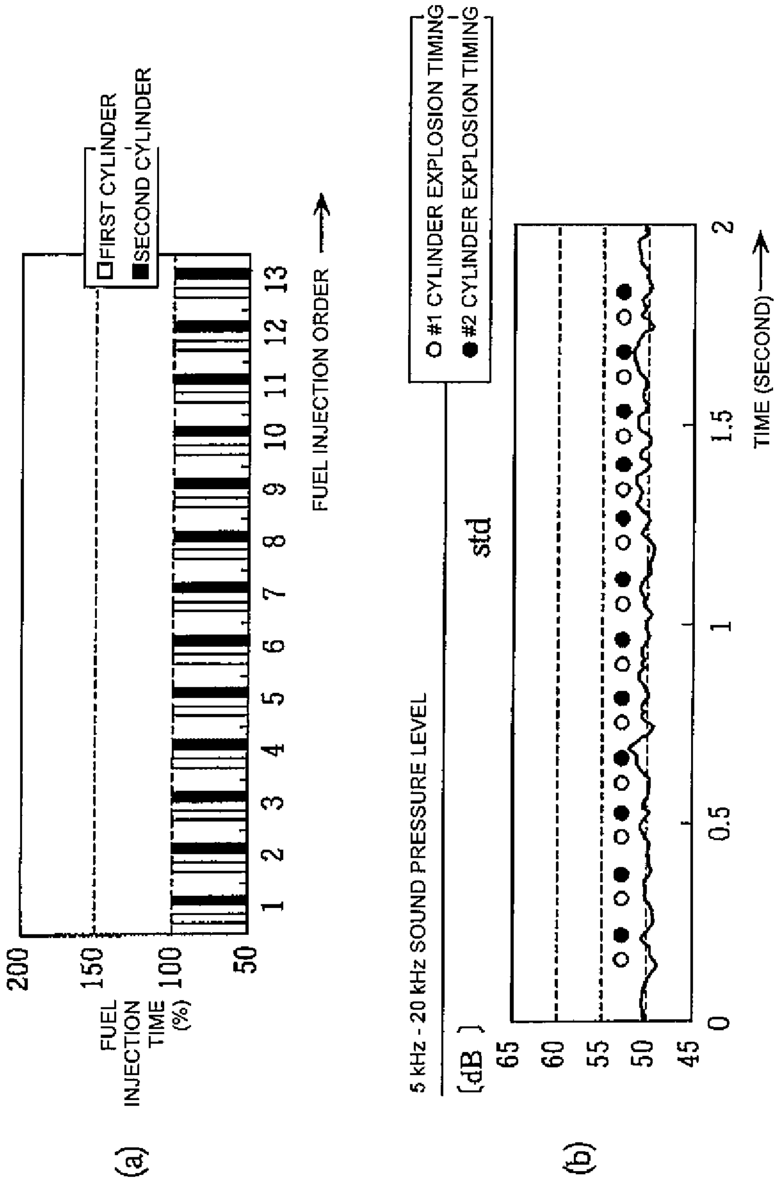
FIGS. 6(*a*) and 6(*b*) show results of experiments executed in the embodiment.

FIGS. 1 through 13 show an embodiment according to the invention. FIGS. 1(*a*) and 1(*b*) schematically illustrate a structure of a motorcycle. FIG. 2 schematically illustrates an engine. FIG. 3 is a block diagram showing a combustion controller. FIGS. 4(*a*) and 4(*b*) are flowcharts showing mode selection. FIGS. 5(*a*) and 5(*b*) show images of control methods. FIGS. 6(*a*) and 6(*b*) through 10(*a*) and 10(*b*) show relationships between combustion control and sound pressure level. FIGS. 11(*a*) and 11(*b*) through 13(*a*) and 13(*b*) show relationships between combustion control and exhaust gas components.

In the figures, a motorcycle 30 on which an engine in this embodiment is mounted is shown, and the motorcycle 30 has the following structure. A front fork 32 is supported by a head pipe at the front end of a vehicle body frame 31 such that the front fork 32 can freely turn to the left and right. A front wheel 33 is supported by the lower end of the front fork 32. A steering handlebar 34 is attached to the upper end of the front fork 32. Rear arms are supported by the rear part of the vehicle body frame 31 such that the rear arms can freely swing upward and downward. A rear wheel 35 is supported by the rear ends of the rear arms. An engine main body 1 in this embodiment is mounted on the central portion of the vehicle body frame 31. A fuel tank 36 is equipped above the engine main body 1, and a main seat 37 and a tandem seat 38 are disposed in this order behind the fuel tank 36. An exhaust device 40 of the motorcycle 30 has exhaust pipes 40*a* connected with the engine main body 1 and a muffler 40*b* connected with the rear ends of the exhaust pipes 40*a*. Ahead light 39 is also provided.

The engine according to the invention includes not only the above-mentioned engine main body 1 but also all the components associated with the operation of the engine main body such as the exhaust device 40 having the exhaust pipes and the muffler connected with the engine main body 1, and an air intake device having air intake ports, an air cleaner and the like.

The engine main body 1 is a v-type two-cylinder engine which has a first cylinder 3 at the front upper wall of a crank case 2 and a second cylinder 4 at the rear upper wall of the crank case 2, forming an entire appearance of V shape. The first cylinder 3 has a first cylinder head 5 which is located on a first cylinder body 3*b* and connected with a first head cover (not shown), and a first piston 7 which is provided within a first cylinder bore 3*a* and connected with a crank pin 11*a* of a crank shaft 11 via a first connecting rod 9. The second cylinder 4 has a second cylinder head 6 which is located on a second cylinder body 4*b* and connected with a second head cover (not shown), and a second piston 8 which is provided within a second cylinder bore 4*a* and connected with the crank pin 11*a* of the crank shaft 11 via a second connecting rod 10. First and second combustion chambers are spaces surrounded by the corresponding cylinder bores, pistons, and cylinder heads.

Combustion chamber side openings of an intake port 5*a* and an exhaust port 5*b* which are open to the combustion chamber of the first cylinder head 5 are opened and closed by an intake valve 12*a* and an exhaust valve 12*b*. Similarly, combustion chamber side openings of an intake port 6*a* and an exhaust port 6*b* which are open to the combustion chamber of the second cylinder head 6 are opened and closed by an intake valve 13*a* and an exhaust valve 13*b*. First and second ignition plugs 23*b* and 24*b* are screwed into the first and second cylinder heads 5 and 6 such that the first and second ignition plugs 23*b* and 24*b* can be exposed to the inside of the combustion chambers.

An air cleaner 20 used for both the first and second cylinders 3 and 4 is connected to the upstream ends of first and second intake passages 5*c* and 6*c* connected with the first and second intake ports 5*a* and Ga. First and second fuel injection valves (combustion adjusting devices) 14 and 15 are provided at certain positions of the first and second intake passages 5*c* and 6*c*, respectively, so that fuel can be injected and supplied into the combustion chambers through the intake valve openings under the control of the fuel injection valves.

First and second throttle valves 16 and 17 are disposed upstream of the first and second fuel injection valves 14 and 15. The first and second throttle valves 16 and 17 are so-called electronically controlled throttle valves provided with electric motors 16*a* and 17*a* for controlling the degree of valve opening. When the rider opens or closes a throttle grip 34*a* of the steering handlebar 34, the electric motors 16*a* and 17*a* rotate the throttle valves 16 and 17 to adjust the degree of valve opening to the degree of grip opening. A throttle sensor 24 for detecting the degree of opening of the throttle valves 16 and 17 is provided on the valve shafts of the throttle valves 16 and 17.

First and second intake pressure sensors 18 and 19 for detecting intake air amount from the internal pressure of the intake passages are equipped upstream of both the throttle valves 16 and 17. Obviously, airflow meters may be substituted for the intake pressure sensors.

Intake air amount signals a1 and a2 detected by the first and second intake pressure sensors 18 and 19, crank angle signals v detected by a crank angle sensor 21, throttle opening signals b detected by the throttle sensor 24, vehicle speed signals s detected by a vehicle speed sensor 23, and other signals detected by various other sensors are all inputted to an ECU 22.

The ECU 22 functions as an operation condition detecting unit for detecting the operation condition of the engine based on the intake air amount, the engine revolution speed, the throttle opening, and the vehicle speed signals. The ECU 22 also functions as a controller for controlling the combustion condition of the engine 1 based on the operation condition (operation range) detected by the operation condition detecting unit. More specifically, fuel injection control signals A1 and A2 are outputted from the ECU 22 to the first and second combustion injection valves 14 and 15. Also, ignition timing control signals B1 and B2 are outputted from the ECU 22 to ignition coils 23*a* and 24*a* of the first and second ignition plugs 23*b* and 24*b*, and throttle opening control signals C1 and C2 are outputted from the EUC 22 to the electric motors 16*a* and 17*a*.

The engine main body 1 is mounted on the vehicle body frame 31 in such a position that the first cylinder 3 and the second cylinder 4 are disposed at the front and at the rear, respectively, in the vehicle front-to-rear direction with the crank shaft 11 extending parallel to the vehicle width direction. The engine main body 1 may be mounted such that it is directly connected as a strengthening member for the vehicle body frame 31, or may be mounted with an elastic member such as a rubber damper interposed between the engine main body 1 and the vehicle body frame 31 such that the engine main body 1 can swing relative to the vehicle body frame 31 in the range of the elasticity of the rubber damper.

In the former structure where the engine main body 1 is directly connected to the vehicle body frame 31, it is considered that the rider feels that sound and vibration produced from the entire engine including the engine main body and its associated components come not only from the engine itself but also through vehicle body frame 31. In the later structure where the engine main body 1 is mounted on the vehicle body frame 31 with the elastic member interposed therebetween, it is considered that the sound and vibration generated from the engine itself coming through the vehicle body frame 31 to the outside are greatly reduced. Thus, the sound and vibration transmitted from the same engine to the rider differ depending on the mounting method of the engine on the vehicle body frame.

The combustion controller (ECU) 22 in this embodiment can switch between a change mode in which the maximum point of a sound pressure level waveform of an audible sound wave generated from the engine 1 or the vehicle body frame is automatically shifted by a predetermined amount or larger within a predetermined period by changing the combustion condition of the engine 1 based on the operation condition of the engine main body 1, and a standard mode in which the combustion condition of the engine main body 1 is adjusted to the combustion condition corresponding to the target operation condition.

More specifically, the ECU 22 is so designed as to be capable of individually controlling the combustion conditions of the first cylinder 3 and the second cylinder 4. Thus, either the change mode in which the combustion condition is changed by one cycle, a plurality of cycles, or random cycles by altering the fuel supply amount, ignition timing, or the intake air amount, or the standard mode in which the fuel supply amount and the like are controlled such that the combustion condition corresponding to the target operation condition can be achieved can be selected for both the first cylinder 3 and the second cylinder 4.

The change mode or the standard mode may be selected automatically based on the engine operation condition or other conditions which will be described later, manually in accordance with the preference of the rider, or both automatically and manually.

The condition that "the maximum point of the sound pressure level waveform is shifted by a predetermined amount or larger within a predetermined period" means that the shift amount of the maximum point (peak value) of the sound pressure level waveform generated within one cycle of the engine, i.e., within the period of one combustion cycle (crank angle of 720°) is shifted by a predetermined amount or larger by one cycle, a plurality of cycles, or random cycles.

The condition that the shift amount of the maximum point is a predetermined amount or larger means that the shift amount is large to such an extent that the rider, the co-passenger, or persons around the vehicle can feel the change of the sound pressure level. More specifically, when the maximum point does not change in such cases as the maximum point keeps "high-high-high - - - " or "low-low-low - - - ", these cases do not coincide with the condition that "the maximum point of the sound pressure level waveform is shifted" according to the invention. When the maximum point changes as "high-low-high-low" within a predetermined period (more specifically, 40-4000 msec.) and the shift amount between the high value and the low value is a predetermined amount or larger (more specifically, 1 dB or larger so that the intensity of the maximum point changes by 1 dB or larger), for example, this case corresponds to the condition that "the maximum point of the sound pressure level waveform is shifted" according to the invention. Additionally, when the overall sound pressure level increases or decreases with the maximum point changing as "high-low-high-low - - - ", this case falls within the condition that "the maximum point of the sound pressure level waveform is shifted" according to the invention.

The condition that the maximum point of the sound pressure level waveform is "automatically shifted" means that the sound pressure level is shifted by controlling the fuel injection amount or the like using the ECU 22. Such a case where the idling revolution speed is manually decreased to such an extent that accidental fire occurs so as to change the sound pressure level does not fall within the scope of the invention.

In the standard mode, the fuel amount supplied from the first and second fuel injection valves 14 and 15 to the first and second cylinders 3 and 4 is kept constant at the standard amount. In the change mode, the fuel amount supplied from the second fuel injection valve 15 disposed on the rear side to the second cylinder 4 is kept constant at the standard amount, and the fuel amount supplied from the first fuel injection valve 14 disposed on the front side to the first cylinder 3 is altered by one cycle (one explosion cycle), a plurality of cycles, or random cycles of the engine so that the combustion condition of the engine can be changed and thus the sound pressure level of the audible sound wave can be changed, for example. The fuel amount may be varied by changing the fuel injection amount per time unit, changing the fuel injection time, or changing both the amount and time. In this embodiment, the method of changing the fuel injection time is employed.

More specifically, as illustrated in FIG. 5(*a*), the fuel supply amount is alternately changed between the standard amount (100%) and a smaller amount such as 80% of the standard amount, for example, when the change mode requirements are satisfied. In this example, the fuel supply amount is altered by one cycle as 1006-80%-100%-80% - - - . Obviously, changes may have various other patterns as 100%-80%-80%-100%-80%-80%-100% - - - and 100%-100%-80%-100%-100%-80% - - - . The standard amount corresponds to the fuel injection amount at the theoretical air fuel ratio or an output air fuel ratio slightly richer than the theoretical air fuel ratio, and the fuel injection amount sufficient for achieving stable idling revolution. In this case, the fuel amount supplied from the second fuel injection valve 15 disposed on the rear side to the second cylinder 4 is kept constant at the standard amount.

There are various other change patterns of the fuel injection amount in the change mode. For example, such patterns as the fuel injection amount alters between the standard amount (100%) and a larger amount such as 170% and 200% of the standard amount by one cycle, a plurality of cycles, or random cycles can be applied.

Additionally, the fuel supply amount to the second cylinder 4 may be changed with the fuel supply amount to the first cylinder 3 kept constant, or the fuel supply amounts to both the first and second cylinders 3 and 4 may be changed.

The ECU 22 can change the combustion condition and thus shift the maximum point of the sound pressure level waveform by a predetermined amount or larger within a predetermined period by varying the ignition timing. For example, as shown in FIG. 5(*b*), the ignition timing of the second cylinder 4 is kept constant at the standard ignition timing at 10° before the top dead center when the change mode requirements are satisfied in the idling operation condition. On the other hand, the ignition timing of the first cylinder 3 is controlled such that the timing alternately changes between the standard ignition timing (10° before the top dead center) and 5° after the top dead center. Apparently, there are various other change patterns of the ignition timing.

Additionally, there are various patterns for determining operation ranges for which the change mode is selected. For example, as shown in FIG. 4(*a*), the change mode is not selected (OFF) at the time of the first idling immediately after the cold start of the engine (S1), and the change mode is selected (ON) when it is determined that the stable idling condition is achieved based on the engine temperature, engine revolution speed, the commanded fuel injection time, or other conditions (S2). The change mode is OFF when the throttle is opened by racing (S3). The change mode is kept at ON when the first gear of the variable transmission is selected (S4), and is switched to OFF when the throttle is opened and the vehicle starts (S5). When the vehicle stops (vehicle speed: zero) (S6) or when the variable transmission is set at neutral (S7) or returns to idling (S8), the change mode is switched to ON.

The change mode is not always required to be selected in the idling operation range (S2). It is therefore possible to select the standard mode in stead of the change mode for the engine combustion condition even in the idling operation range when the revolution of the engine is unstable, for example.

Also, the standard mode may be selected when the engine revolution speed is constant regarding as the low speed running condition and when the engine revolution speed increases regarding as the acceleration condition. Alternatively, it is possible to determine whether the vehicle is in the constant speed running condition or the acceleration condition from the detection results of the throttle opening and select the standard mode based on the determination.

FIG. 4(*b*) shows another example of the operation ranges for which the change mode is selected. In this example, the standard mode is selected (step S14) when the engine operation is in the first idling condition (step S11) or when the vehicle speed is a predetermined vehicle speed or higher (step S12) or in the acceleration condition in which the acceleration is a predetermined value or higher (step S13). On the other hand, in such a case where the engine operation is not in the first idling condition and the vehicle speed is lower than the predetermined vehicle speed in the non-acceleration condition (steps S11 through S13), the change mode is selected (step S15).

When the change mode is selected for the combustion condition of the engine, the shift amount of the maximum point of the sound pressure level waveform is controlled to be the predetermined amount or larger by one cycle, a plurality of cycles, or random cycles of the engine. Thus, the rider can feel the rotation of the engine more easily than in the case where the maximum value of the sound pressure level waveform is not varied. Accordingly, the rider can positively feel that the engine is operating. Moreover, since the sound pressure level changes in the change mode, the operating condition of the engine can be felt by the rider through the changes in sound even when the rider does not sit on the vehicle in the vehicle stop condition.

At the time of idling, the change mode is selected so that the rider can positively feel the operation of the engine through the shift of the maximum point of the sound pressure level waveform. Thus, erroneous operations in such a case as the rider pushes the engine start switch even in the idling condition of the engine can be prevented.

In this example, the change mode is selected only at the idling condition and then is switched to the standard mode after the vehicle start. Therefore, when variations in sound and vibration become burden for the rider at the time of constant speed running such as touring, the maximum point of the sound pressure level waveform is stabilized so as to solve the problem that the rider is rather tired with the useless variations in sound and vibration.

Since the standard mode is selected for the combustion condition of the engine in the acceleration running operation range such as starting acceleration and overtaking acceleration, lowering of acceleration can be prevented. When the fuel supply amount is decreased by a predetermined cycle to execute the change mode, the output of the engine lowers accordingly. As a result, lowering of acceleration occurs when the change mode is selected in the acceleration running operation range. However, since the standard mode is selected in the acceleration running operation range in this embodiment, this problem does not occur. Moreover, in this embodiment, the combustion condition of the first cylinder 3 remains unchanged in the change mode while the combustion condition of the second cylinder 4 is changed. Accordingly, such a condition where the overall operation of the engine becomes extremely unstable can be prevented, and thus the possibility that the rider erroneously recognizes the unstable condition as an abnormal condition of the engine can be eliminated.

The combustion condition of the engine may be switched between the change mode and the standard mode using a manual changeover switch. In this case, the rider can feel the operation of the engine only when he or she desires to feel the operation of the engine in accordance with his or her preference.

Furthermore, since either the change mode or the standard mode is selected for the combustion condition of the engine by controlling the amount of fuel to be supplied to the engine, the combustion condition can be stably altered and thus the sound pressure level can be easily and securely varied.

Figure 17:
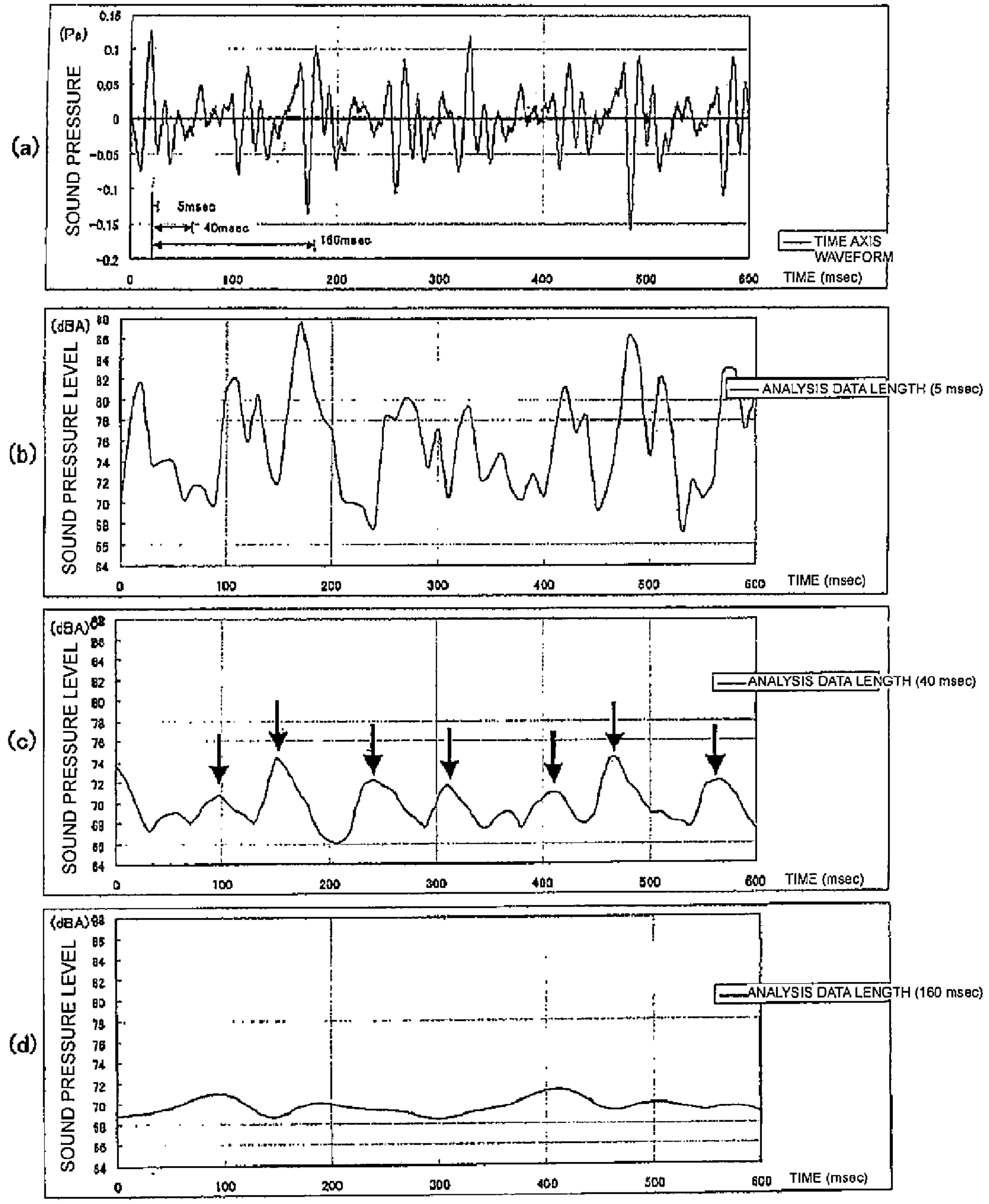
FIGS. 17(*a*) through 17(*d*) are explanatory views showing methods for obtaining sound pressure level waveforms according to the invention.

Next, the results of experiments conducted to confirm the advantages of the invention are shown. FIGS. 17(*a*) through 17(*d*) are explanatory views showing methods for obtaining sound pressure level waveforms according to the experiments. In these experiments, practical sound pressure waveforms (practical data) obtained by a microphone located at a predetermined measurement position were analyzed using various unit analysis data lengths to acquire various types of sound pressure level waveforms (weighted data). Then, the sound pressure level waveform closest to the impression of sound (sound impression) obtained when a person stands by the microphone and actually hears the sound was selected to analyze the shift amount of the sound pressure level. Thus, the sound pressure level waveform in these experiments is intended to be used for visualizing the change conditions of sounds actually heard by a person.

FIG. 17(*a*) shows a practically measured sound pressure waveform (practical data). FIGS. 17(*b*), 17(*c*), and 17(*d*) show sound pressure level waveforms (weighted data) obtained by analyzing the overall frequency bands (overall) of sound pressure waveforms measured using the unit analysis data lengths of 5 msec, 40 msec, and 160 msec, respectively, and then weighting the analyzed sound pressure waveforms (A characteristic).

The process of weighting herein refers to compensation such as multiplying the waveforms by coefficients for emphasizing the sound pressure at frequencies easily audible to the human ears. For obtaining the sound pressure level waveforms, specific frequency bands (pitch of sounds) may be extracted. However, this method is not used but the overall frequency band analysis was adopted in these experiments.

Considerably different sound pressure level waveforms are produced when the unit analysis data lengths for the sound pressure level waveforms are varied. For example, as shown in FIG. 17(*b*), the number of the maximum points of the sound pressure level waveform, i.e., points to be felt as individual sounds by sound impression is at least 18 within 600 msec. In FIG. 17(*c*), there are about 7 maximum points as indicated by arrows. However, no maximum point is clearly exhibited in FIG. 17(*d*).

According to the sound impression obtained when a person actually heard the sound around the measurement point, about 7 sounds as rat-tat-tat - - - within were heard within 600 msec., for example. Thus, in these experiments, the sound pressure level waveform whose unit analysis data length is 40 msec. shown in FIG. 17(*c*) was selected as the waveform closest to the sound impression.

Obviously, the unit analysis data lengths used for obtaining sound pressure level waveforms are not limited to 5, 40, 160 msec. determined as above, but may be established as appropriate lengths for obtaining sound pressure level waveforms as close to the human sound impressions as possible.

In these experiments, the change condition of the sound pressure level waveform obtained in the standard mode where both the combustion conditions of the first cylinder 3 and the second cylinder 4 are stabilized was compared with the change condition of the sound pressure level waveform obtained in the change mode where the combustion of the first cylinder 3 is stabilized and the combustion of the second cylinder 4 is varied. As illustrated in FIGS. 1(*a*) and 1(*b*), the microphone M for measuring the sound pressure waveforms are disposed approximately at the center of the muffler 40*b* in the front-to-rear direction of the vehicle, at a position 500 millimeters shifted to the muffler 40*a* side from a vehicle center line L in the vehicle width direction, and at a height of 1,400 millimeters from the road surface in the height direction.

In the standard mode (see std. FIG. 6), the fuel injection amounts for the first and second cylinders 3 and 4 were both kept constant as the standard amount (100%). In the change mode (see FIGS. 7(*a*) and 7(*b*) through 10(*a*) and 10(*b*)), the fuel injection amount for the first cylinder 3 was kept constant as the standard amount, and the fuel injection amount for the second cylinder 4 was varied by one cycle.

Figure 7:
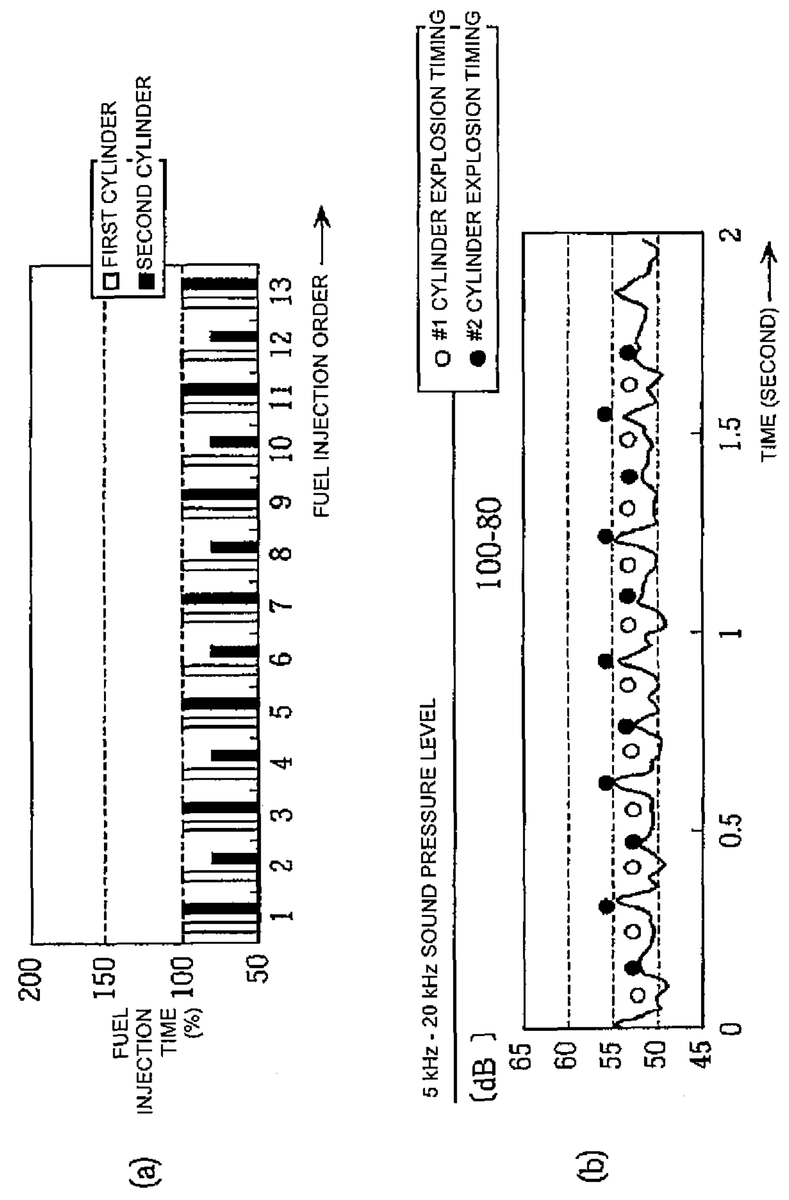
FIGS. 7(*a*) and 7(*b*) show results of experiments executed in the embodiment.
Figure 8:
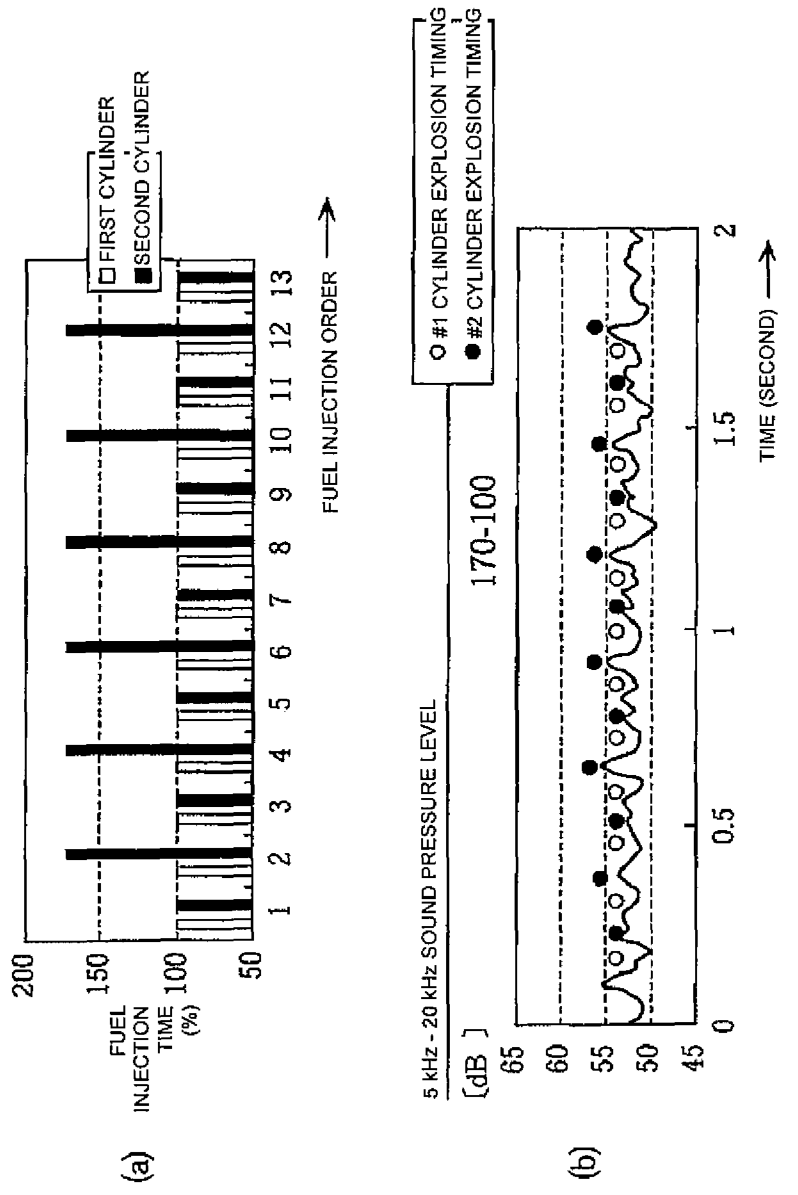
FIGS. 8(*a*) and 8(*b*) show results of experiments executed in the embodiment.
Figure 9:
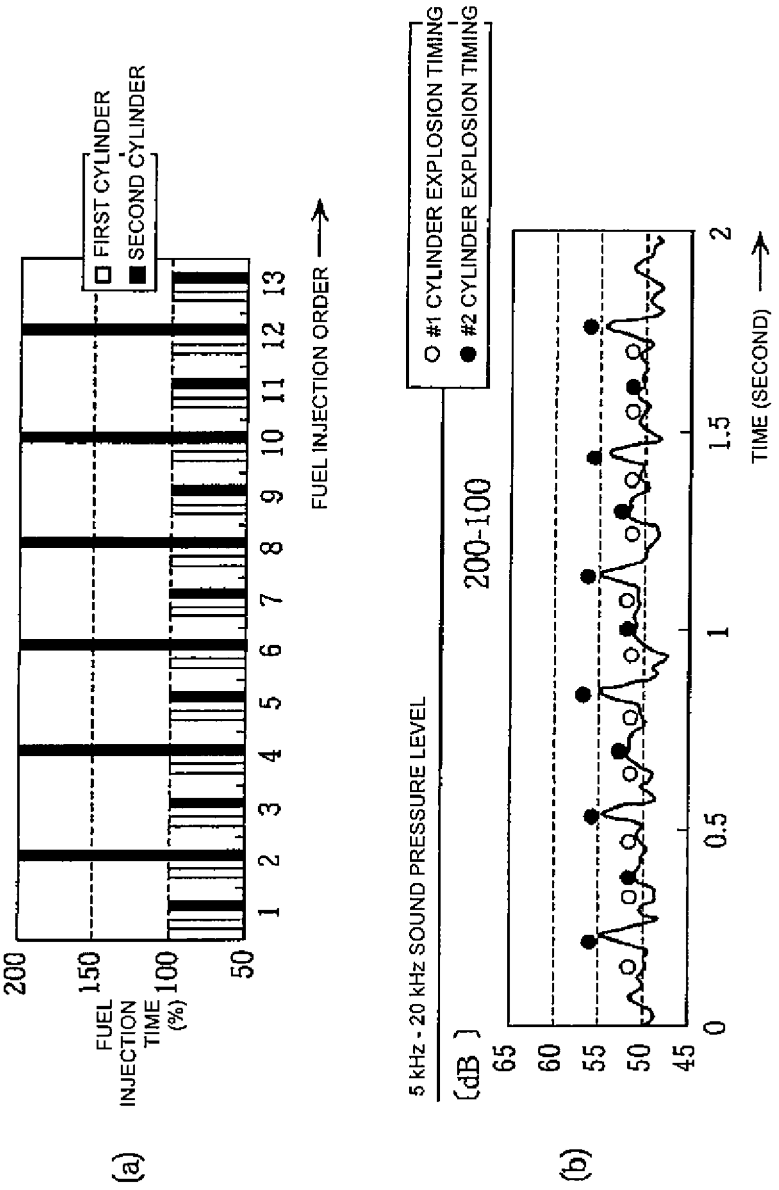
FIGS. 9(*a*) and 9(*b*) show results of experiments executed in the embodiment.
Figure 10:
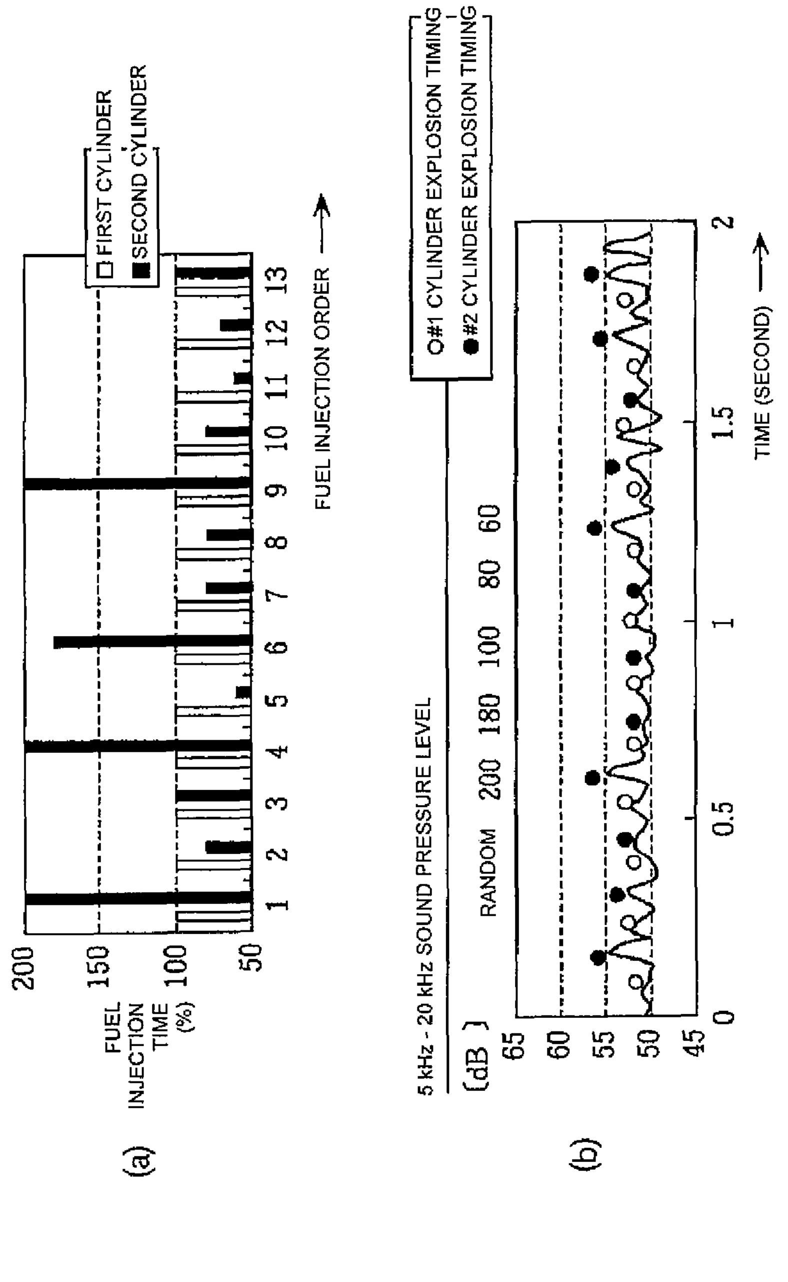
FIGS. 10(*a*) and 10(*b*) show results of experiments executed in the embodiment.
Figure 11:
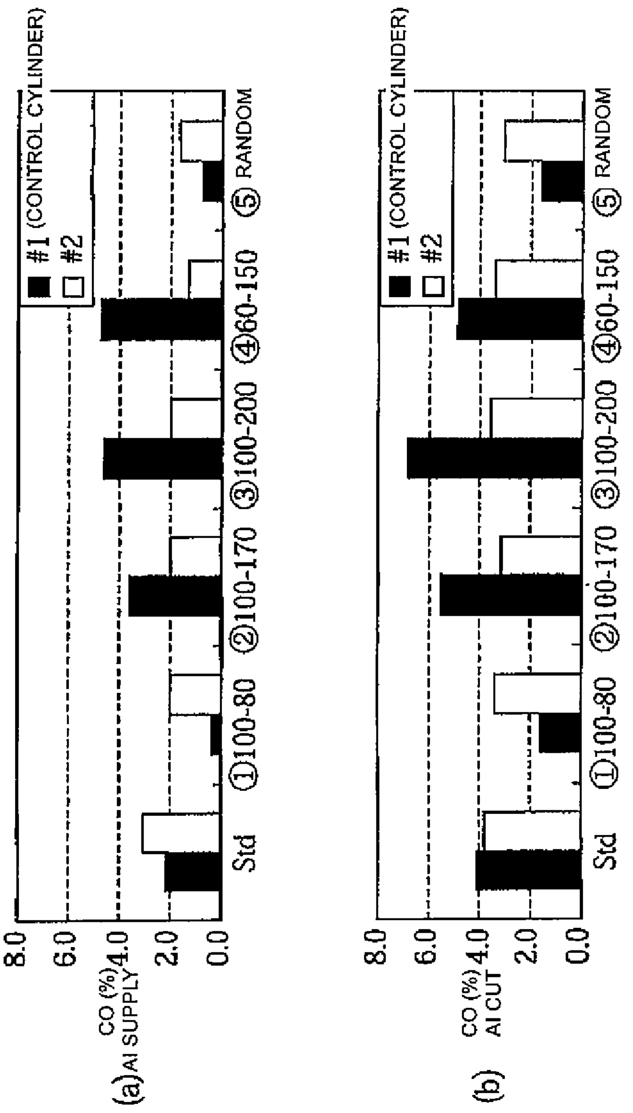
FIGS. 11(*a*) and 11(*b*) show results of experiments executed in the embodiment.
Figure 12:
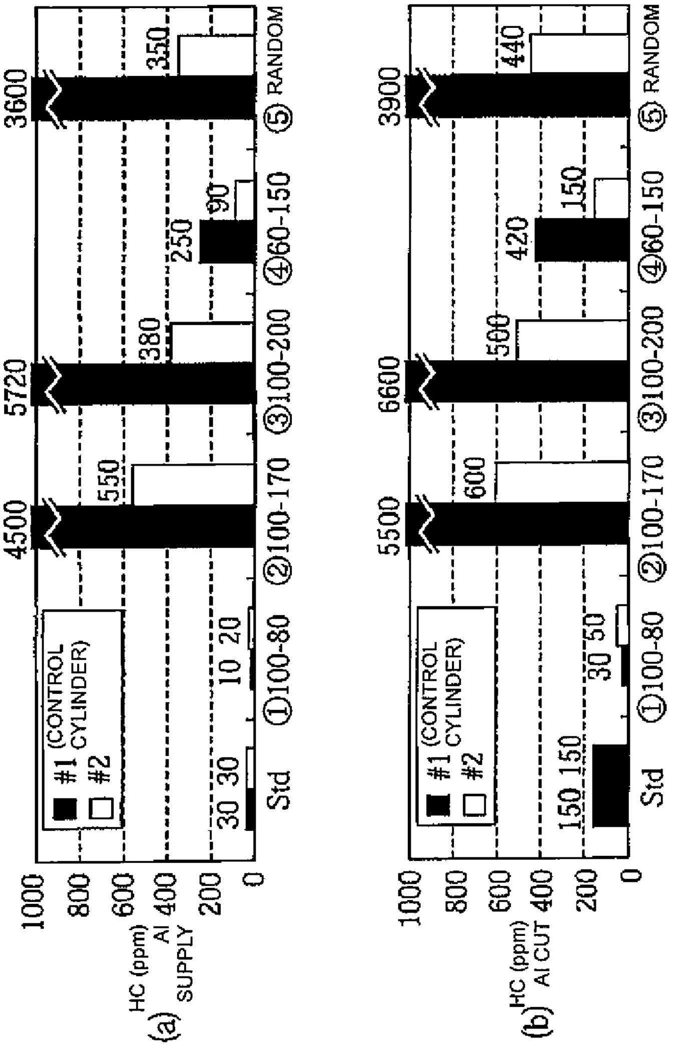
FIGS. 12(*a*) and 12(*b*) show results of experiments executed in the embodiment.
Figure 13:
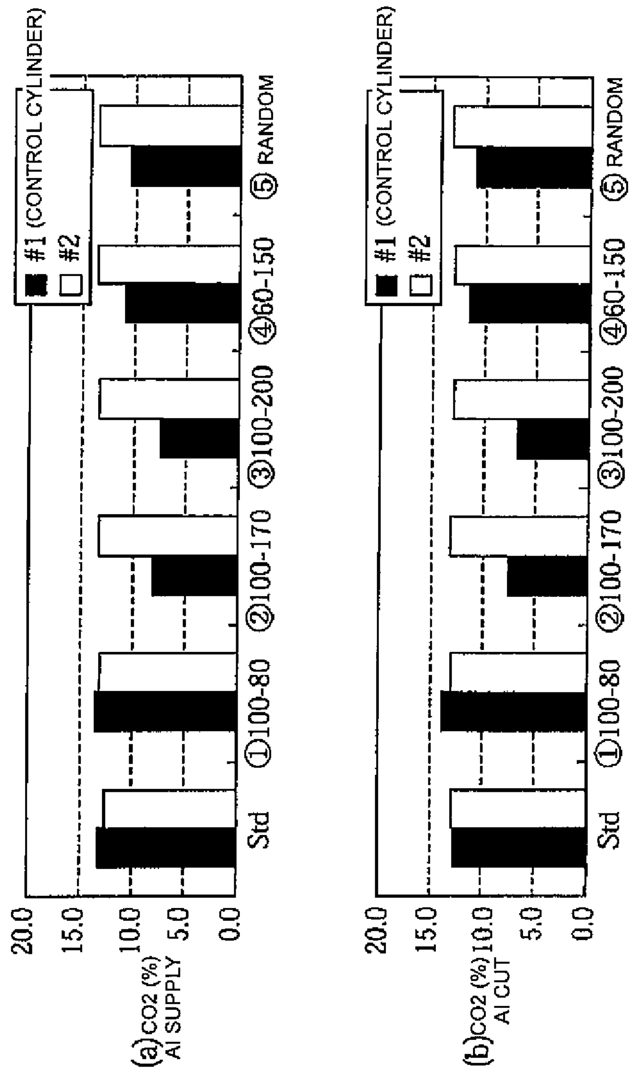
FIGS. 13(*a*) and 13(*b*) show results of experiments executed in the embodiment.

More specifically, as the fuel injection amount to the second cylinder 4 in the change mode, repeating supplies of 100% and 80% (see FIG. 7(*a*)), 100% and 170% (see FIG. 8(*a*)), 100% and 200% (see FIG. 9(*a*)), and random supplies including 200%, 180%, 100%, 80%, and 60% (see FIG. 10(*a*)) were supplied.

The sound pressure levels were measured by the microphone M. Then, the frequency components in frequency areas other than in the range from 5 KHz to 20 KHz were removed and the components in the range from 5 KHz to 20 KHz were totaled to obtain the sound pressure level waveforms.

The maximum points of the sound pressure level waveforms coincide with the explosion timing of the respective cylinders in both of the modes. In the standard (std) mode (see FIG. 6(*b*)), the shift amounts of the maximum points of the sound pressure level waveforms are substantially constant approximately in the range from 49 to 52 dB at the explosion timing of both the first cylinder and the second cylinder. It is therefore considered that variance of the maximum points of the sound pressure level waveforms is small.

In the change mode, while no great variance of the maximum points of the sound pressure level waveforms is exhibited at the explosion timing of the first cylinder, the maximum points of the sound pressure level waveforms greatly vary at the explosion timing of the second cylinder. More specifically, the maximum points of the sound pressure level waveforms vary approximately in the range from 50 to 55 dB in both the cases of 100-80% (FIGS. 7(*a*) and 7(*b*)) and 100-170% (FIGS. 8(*a*) and 8(*b*)), and vary approximately in the range from 48 to 55 dB for the cases of 100-200% (FIGS. 9(*a*) and 9(*b*)) and random supplies of the fuel injection (FIGS. 10(*a*) and 10(*b*)). Thus, the shift amounts of the maximum points of the sound pressure level waveforms are in the range of the predetermined amount or larger, i.e., approximately 5 to 7 dB, which is a sound sufficiently large to such an extent that the rider, the co-passenger, or the person around the vehicle can recognize or larger.

Apparent from the results of these experiments, the maximum point of the sound pressure level waveform greatly shifts by keeping either the first cylinder or the second cylinder constant and varying the fuel supply amount for the other cylinder by one cycle or by random cycles.

FIGS. 11(*a*) and 11(*b*) through 13(*a*) and 13(*b*) show measurement results of the exhaust gas components (CO, HC, $CO_2$) in the standard mode and change mode. In the exhaust gas measurement, the fuel supply amount for the second cylinder is kept constant, and the full supply amount for the first cylinder is varied as 100-80%, 100-170%, 100-200%, and 60-150% by one cycle, and randomly in the range including 200, 180, 100, 80, and 60%. In FIGS. 11(*a*) and 11(*b*) through 13(*a*) through 13(*b*), “AI supply” and “AI cut” mean that the secondary air is supplied and not supplied into the certain areas of the exhaust pipes, respectively.

Concerning the exhaust gas component CO, the CO amount in the first cylinder is larger than the CO amount in the second cylinder for the fuel supply amounts varying as 100-170%, 100-200%, and 60-150%, and is smaller than in the second cylinder in the case of 100-80% and the random supply amounts. As for HC, no difference is exhibited in the case of 100-80%, but the HC amount in the first cylinder is larger than the CO amount in the second cylinder in other cases. For $CO_2$, no great difference can be seen in the case of 100-80%, but the $CO_2$ amount in the first cylinder is slightly smaller than the $CO_2$ amount in the second cylinder in other cases.

As obvious from the measurement results of the shift amounts of the maximum points of the sound pressure level waveforms and the exhaust gas components, it is preferable to vary the fuel supply amount within the range between the standard amount and an amount smaller than the standard amount (such as 100-80%) so that the maximum-point of the sound pressure level waveform can be shifted without deteriorating the exhaust gas components.

In this embodiment, the combustion condition is altered by varying the fuel supply amount so as to shift the maximum point of the sound pressure level waveform. However, the combustion condition may be changed by altering other elements such as the intake air amount by one cycle, a plurality of cycles, or random cycles, or by advancing or delaying the ignition timing in a similar manner so as to change the sound pressure level of the audible sound wave.

Figure 14:
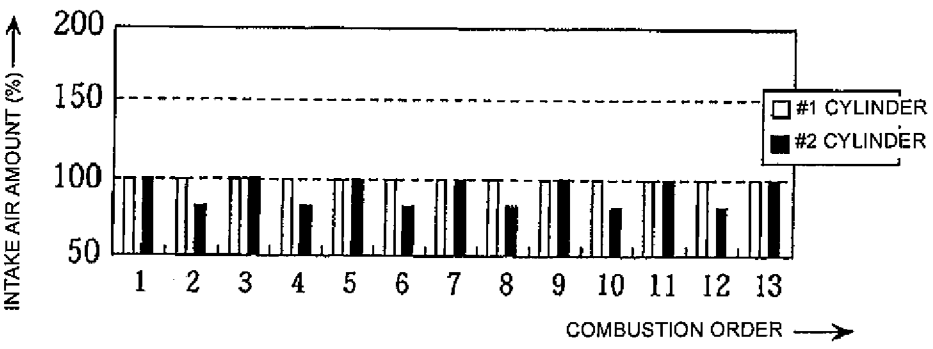
FIG. 14 is an explanatory view showing another embodiment according to the invention.

FIG. 14 shows an example in which the intake air amount is varied in the idling operation condition, for example. In this example, the intake air amount for the first cylinder is kept constant, and the intake air amount for the second cylinder is varied between 100% and 80%. The variance in the intake air amount can be estimated by measuring the pressure in the intake pipe of the specific cylinder. When the intake air amount is varied, both of the fuel supply amount and the ignition timing or either of these may be additionally varied or none of these may be varied. In this method in which the intake air amount is varied, the maximum point of the sound pressure level waveform can be shifted by the predetermined amount or larger within the predetermined period.

Figure 15:
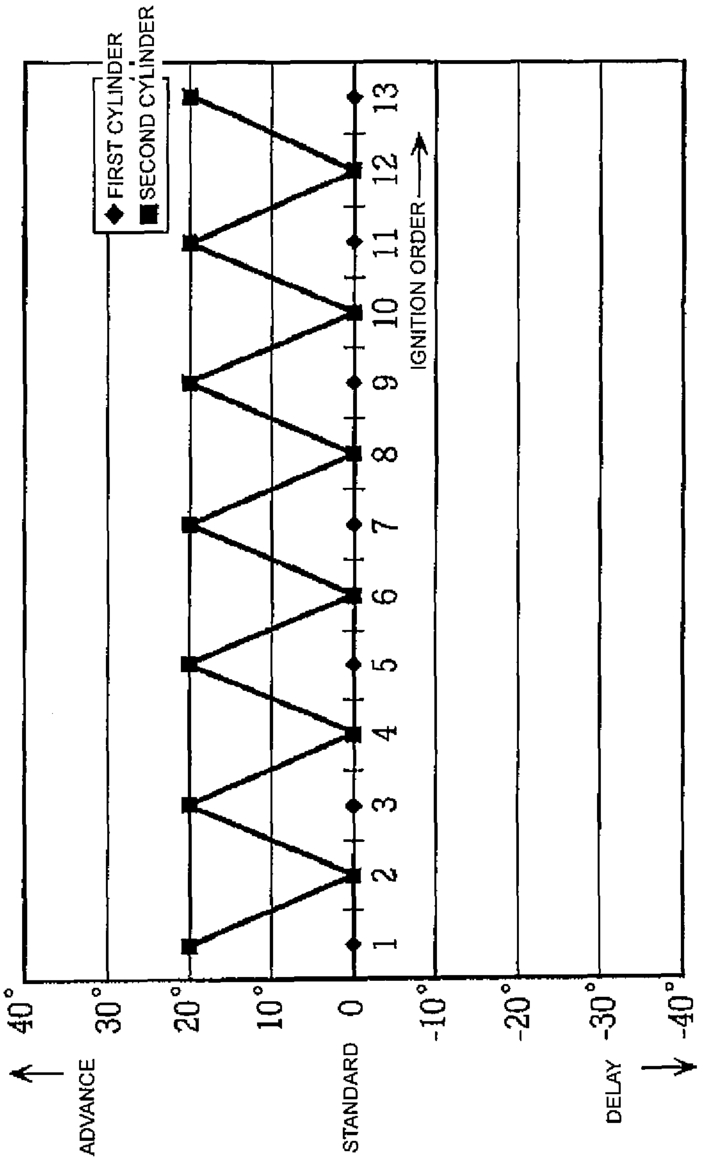
FIG. 15 is an explanatory view showing still another embodiment according to the invention.
Figure 16:
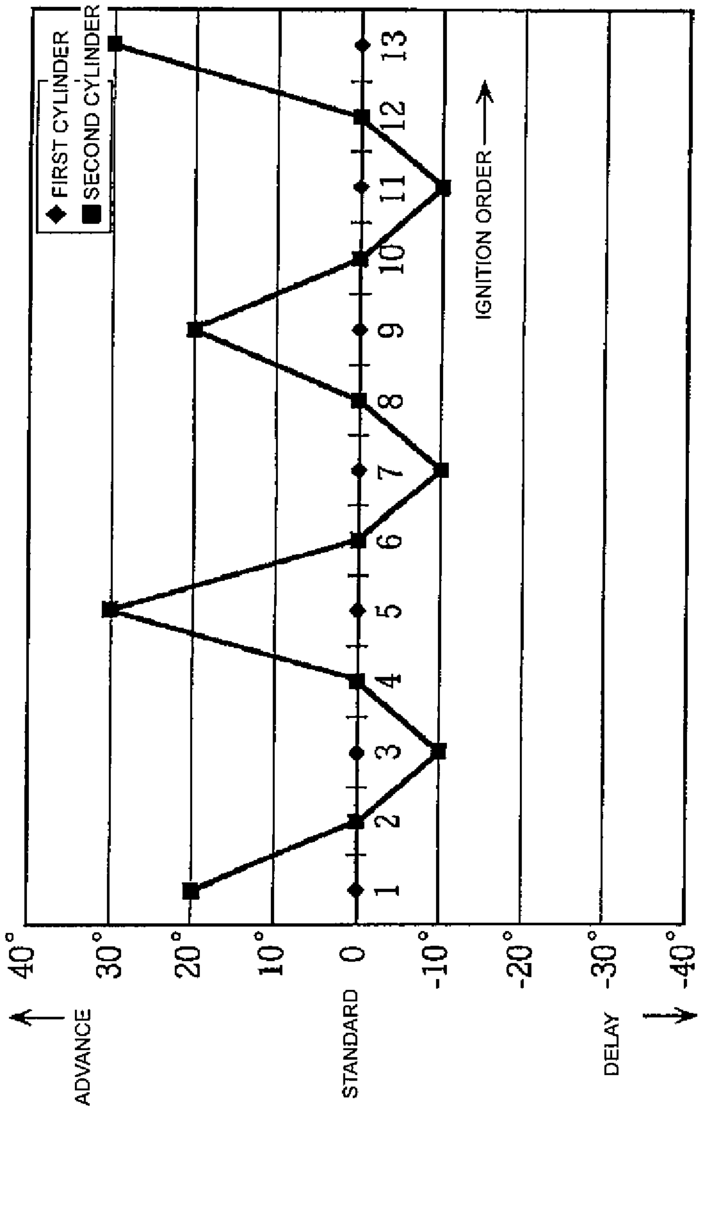
FIG. 16 is an explanatory view showing still another embodiment according to the invention.

FIGS. 15 and 16 show examples in which the ignition timing is varied in the idling operation condition, for example. In both cases, the ignition timing for the first cylinder is kept constant at the standard ignition timing in the idling operation (such as 10° before the top dead center), and the ignition timing for the second cylinder is varied between the standard ignition timing and the ignition timing 20° before the standard ignition timing (such as 30° before the top dead center) in the example shown in FIG. 15. The ignition timing for the second cylinder in the case shown in FIG. 16 is varied among the standard ignition timing, 10° after the standard ignition timing (such as the top dead center), 20° before the standard ignition timing (such as 30° before the top dead center), and 30° before the standard ignition timing (such as 40° before the top dead center). In this method in which the ignition timing is varied, the maximum point of the sound pressure level waveform can be shifted by the predetermined amount or larger within the predetermined period.

The invention is also applicable to the following engine. This engine has a plurality of cylinders. The combustion controller controls the combustion adjusting device such that the maximum point of the sound pressure level waveform of the audible sound wave generated from the engine or the vehicle body frame can be shifted by a predetermined amount or larger within a predetermined period for some of the plural cylinders, and controls the combustion adjusting device such that the combustion condition of the engine becomes the combustion condition corresponding to the target operation condition for the rest of the cylinders.

In this structure, the sound pressure level may be varied under the stable operation of the engine by shifting the maximum point of the sound pressure level waveform for some of the plural cylinders and selecting the standard mode for the rest of the cylinders so that the dynamic operation of the engine can be felt.

In some of the cylinders, accidental fire may occur depending on the degree of change in the combustion condition. However, in this example, the rider can more clearly feel the operation of the engine since the sound pressure level varies in a wider range.

While the combustion conditions of some of the cylinders vary, the combustion conditions of the rest of the cylinders are stable. Since the cylinders whose combustion conditions vary and the cylinders whose combustion conditions are stable are combined, the condition where the engine becomes extremely unstable can be prevented. As a result, the possibility that the rider erroneously recognizes the change of the combustion conditions of some cylinders as an overall abnormal condition of the entire engine can be eliminated.

The invention is also applicable to still another type of engine. The engine has a plurality of cylinders. The combustion controller controls the combustion adjusting device such that the maximum point of the sound pressure level waveform of the audible sound wave generated from the engine or the vehicle body frame can be shifted by a predetermined amount or larger within a predetermined period for all the plural cylinders.

In this structure, the shifting patterns of the sound pressure level can be freely established under the stable operation of the engine so that the dynamic operation of the engine can be felt.

While the maximum point of the sound pressure level waveform of the audible sound wave is shifted in the above embodiments, the maximum point of the vibration level waveform generated from the engine or the vehicle body frame can be shifted by varying the combustion condition in the same manner as above.

Additionally, while the example of the V-type two-cylinder engine to which the invention is applied has been discussed, the invention may be applied to other types of engine such as one-cylinder engine.

The invention claimed is:

1. A straddle-type vehicle, comprising:

a vehicle body frame;

an engine mounted on the vehicle body frame;

a combustion adjusting device for adjusting a combustion condition of the engine; and a combustion controller for controlling the combustion adjusting device such that during a predetermined period, during which a plurality of combustion cycles occur, maximum points of a sound pressure level waveform of an audible sound wave generated from the engine are generated, each of the maximum points corresponding to a maximum intensity of the sound pressure level waveform during one of the combustion cycles so that each of the combustion cycles has a respective maximum point of the maximum points, during the predetermined period, the maximum points being shifted from each other by at least a predetermined amount so as to cause an irregular timing of the maximum points.

2. A straddle-type vehicle according to claim 1, wherein the combustion controller controls the combustion adjusting device such that the maximum intensities of the maximum points are shifted from each other so that a person sitting on the straddle-type vehicle or positioned adjacent to the straddle-type vehicle recognizes the shift of the maximum points.

3. A straddle-type vehicle according to claim 1, wherein the combustion adjusting device includes at least one of a fuel supply device, an ignition device, an intake valve opening/closing timing adjusting device, exhaust valve opening/closing timing adjusting device, an equivalent pipe length adjusting device for an intake pipe, an equivalent pipe length adjusting device for an exhaust pipe, an electrically powered throttle control device, and an idling speed adjusting device.

4. A straddle-type vehicle according to claim 1, further comprising a sensor for detecting an operation condition of the engine, and the combustion controller controls the combustion adjusting device such that the maximum points of the sound pressure level waveform of the audible sound wave are shifted from each other by at least the predetermined amount based on signals from the sensor at least in some operation conditions of the engine.

5. A straddle-type vehicle according to claim 1, further comprising a sensor for detecting an operation condition of the engine, and the combustion controller controls the combustion adjusting device such that the maximum points of the sound pressure level waveform of the audible sound wave are shifted from each other by at least the predetermined amount within the predetermined period based on signals from the sensor and in an idling condition of the engine.

6. A straddle-type vehicle according to claim 1, wherein the combustion controller is switchable between a change mode in which the maximum points of the sound pressure level waveform of the audible sound wave are shifted from each other by at least the predetermined amount within the predetermined period, and a standard mode in which the combustion condition of the engine becomes a combustion condition corresponding to a target operation condition.

7. A straddle-type vehicle according to claim 6, further comprising a sensor for detecting an operation condition of the engine, and the combustion controller controls the combustion adjusting device such that the change mode is selected in an idling condition of the engine, and the standard mode is selected in operation conditions, other than the idling condition, based on signals from the sensor.

8. A straddle-type vehicle according to claim 6, further comprising a sensor for detecting an operation condition of the vehicle, and the combustion controller controls the combustion adjusting device such that the standard mode is selected in a constant speed running condition of the vehicle based on signals from the sensor.

9. A straddle-type vehicle according to claim 6, further comprising a sensor for detecting the operation condition of the engine, and the combustion controller controls the combustion adjusting device such that the standard mode is selected in an acceleration condition of the engine based on signals from the sensor.

10. A straddle-type vehicle according to claim 1, wherein the combustion controller controls the combustion adjusting device such that at the maximum points, the sound pressure level waveform is in a high frequency band.

11. A straddle-type vehicle according to claim 1, wherein the combustion controller controls the combustion adjusting device such that at the maximum points, the sound pressure level waveform is in a low frequency band.

12. A combustion controller for a straddle-type vehicle which controls a combustion adjusting device for adjusting a combustion condition of an engine mounted on a vehicle body frame, wherein the combustion controller controls the combustion adjusting device such that during a predetermined period, during which a plurality of combustion cycles occur, maximum points of a sound pressure level waveform of an audible sound wave generated from the engine are generated, each of the maximum points corresponding to a maximum intensity of the sound pressure level waveform during one of the combustion cycles so that each of the combustion cycles has a respective maximum point of the maximum points, during the predetermined period, the maximum points being shifted from each other by at least a predetermined amount so as to cause an irregular timing of the maximum points.

13. A combustion controller for a straddle-type vehicle according to claim 12, wherein the combustion controller controls the combustion adjusting device such that the maximum intensities of the maximum points are shifted from each other so that a person sitting on the straddle-type vehicle recognizes the shift of the maximum points.

14. A straddle-type vehicle, comprising:

a vehicle body frame;

an engine mounted on the vehicle body frame;

a combustion adjusting device for adjusting a combustion condition of the engine; and a combustion controller for controlling the combustion adjusting device such that during a predetermined period, during which a plurality of combustion cycles occur, maximum points of a sound pressure level waveform of an audible sound wave generated from the engine are generated, each of the maximum points corresponding to a maximum intensity of the sound pressure level waveform during one of the combustion cycles so that each of the combustion cycles has a respective maximum point of the maximum points, during the predetermined period, the maximum points being shifted from each other by at least a predetermined amount so as to cause the maximum points to have different intensities from each other.

15. A straddle-type vehicle according to claim 14, wherein the predetermined period is in a range from 40 milliseconds to 4,000 milliseconds; and the predetermined amount is at least 1 dB.

16. A straddle-type vehicle according to claim 14, wherein the combustion controller controls the combustion adjusting device such that the maximum points are shifted from each other to correspond to a predetermined pattern.

17. A straddle-type vehicle according to claim 14, wherein the combustion controller controls the combustion adjusting device such that the maximum points are shifted randomly from each other.

18. The straddle-type vehicle according to claim 14, wherein the engine has first and second cylinders, and the combustion controller controls ignition timings of the first cylinder to be a standard ignition timing before a top dead center of the first cylinder, and controls ignition timings of the second cylinder to include both the standard ignition timing before a top dead center of the second cylinder, and at least a 5 degrees difference from the standard ignition timing after the top dead center of the second cylinder.

19. A combustion controller for a straddle-type vehicle which controls a combustion adjusting device for a combustion condition of an engine mounted on a vehicle body frame, wherein the combustion controller controls the combustion adjusting device such that during a predetermined period, during which a plurality of combustion cycles occur, maximum points of a sound pressure level waveform of an audible sound wave generated from the engine are generated, each of the maximum points corresponding to a maximum intensity of the sound pressure level waveform during one of the combustion cycles so that each of the combustion cycles has a respective maximum point of the maximum points, during the predetermined period, the maximum points being shifted from each other by at least a predetermined amount so as to cause the maximum points to have different intensities from each other.

20. A combustion controller for a straddle-type vehicle according to claim 19, wherein the combustion controller controls the combustion adjusting device such that the intensities of the maximum points are shifted from each other so that a person positioned adjacent to the straddle-type vehicle recognizes the shift of the maximum points.

21. A straddle-type vehicle, comprising:

a vehicle body frame;

an engine mounted on the vehicle body frame;

a combustion adjusting device for adjusting a combustion condition of the engine; and a combustion controller for controlling the combustion adjusting device such that during a predetermined period, during which a plurality of combustion cycles occur, maximum points of a sound pressure level waveform of an audible sound wave generated from the engine are generated, each of the maximum points corresponding to a maximum intensity of the sound pressure level waveform during one of the combustion cycles so that each of the combustion cycles has a respective maximum point of the maximum points, during the predetermined period, the maximum points being shifted from each other by at least a predetermined amount so that in each of the respective combustion cycles, an intensity of the respective maximum point of the respective combustion cycle is different than one of an intensity of the respective maximum point of a directly following one of the combustion cycles that directly follows the respective combustion cycle, and an intensity of the respective maximum point of a directly preceding one of the combustion cycles that directly precedes the respective combustion cycle.

22. A straddle-type vehicle, comprising:

a vehicle body frame;

an engine mounted on the vehicle body frame;

a combustion adjusting device for adjusting a combustion condition of the engine; and a combustion controller for controlling the combustion adjusting device such that during a predetermined period, during which a plurality of combustion cycles occur, maximum points of a sound pressure level waveform of an audible sound wave generated from the engine are generated, each of the maximum points corresponding to a maximum intensity of the sound pressure level waveform during one of the combustion cycles so that each of the combustion cycles has a respective maximum point of the maximum points, during the predetermined period, the maximum points being shifted from each other by at least a predetermined amount so that in each of the respective combustion cycles, a timing of the respective maximum point with respect to the respective combustion cycle is different than one of a timing of the respective maximum point of a directly following one of the combustion cycles that directly follows the respective combustion cycle, with respect to the directly following one combustion cycle, and a timing of the respective maximum point of a directly preceding one of the combustion cycles that directly precedes the respective combustion cycle, with respect to the directly preceding one combustion cycle.

* * * * *